US009069174B2

(12) United States Patent
Itami et al.

(10) Patent No.: US 9,069,174 B2
(45) Date of Patent: Jun. 30, 2015

(54) OPTICAL SCANNING UNIT AND IMAGE FORMING APPARATUS

(71) Applicants: Yukio Itami, Kanagawa (JP); Yoshinori Hayashi, Kanagawa (JP); Naoki Miyatake, Kanagawa (JP); Yukihisa Yokoyama, Kanagawa (JP)

(72) Inventors: Yukio Itami, Kanagawa (JP); Yoshinori Hayashi, Kanagawa (JP); Naoki Miyatake, Kanagawa (JP); Yukihisa Yokoyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/934,967

(22) Filed: Jul. 3, 2013

(65) Prior Publication Data

US 2014/0009555 A1    Jan. 9, 2014

(30) Foreign Application Priority Data

Jul. 5, 2012    (JP) ................................. 2012-151306
May 29, 2013    (JP) ................................. 2013-112429

(51) Int. Cl.
*G02B 26/12* (2006.01)
*B41J 2/44* (2006.01)
*B41J 2/47* (2006.01)

(52) U.S. Cl.
CPC . *G02B 26/12* (2013.01); *B41J 2/44* (2013.01); *B41J 2/471* (2013.01); *G02B 26/123* (2013.01); *G02B 26/124* (2013.01)

(58) Field of Classification Search
CPC .... G02B 26/12; G02B 26/123; G02B 26/124; G02B 13/0005; B41J 2/44; B41J 2/47

USPC .................................................. 347/257–261
See application file for complete search history.

(56) References Cited

U.S. PATENT DOCUMENTS

| | | | |
|---|---|---|---|
| 5,069,515 A | 12/1991 | Itami et al. |
| 5,557,448 A | 9/1996 | Endo et al. |
| 5,570,224 A | 10/1996 | Endo et al. |
| 5,581,392 A | 12/1996 | Hayashi |
| 5,652,670 A | 7/1997 | Hayashi |
| 5,680,254 A | 10/1997 | Ueda et al. |
| 5,726,699 A | 3/1998 | Itami et al. |
| 5,739,602 A | 4/1998 | Suzuki et al. |
| 5,875,051 A | 2/1999 | Suzuki et al. |
| 6,069,724 A | 5/2000 | Hayashi et al. |
| 6,081,386 A | 6/2000 | Hayashi et al. |

(Continued)

FOREIGN PATENT DOCUMENTS

| | | |
|---|---|---|
| JP | 9-211366 | 8/1997 |
| JP | 10-206778 | 8/1998 |
| JP | 2005-092129 | 4/2005 |

*Primary Examiner* — Sarah Al Hashimi
(74) *Attorney, Agent, or Firm* — Oblon, McClelland, Maier & Neustadt, L.L.P.

(57) ABSTRACT

An optical scanning unit includes a rotatable multi-faceted mirror having a plurality of faces reflecting light flux emitted from a light source to scan a scanning area in a main scanning direction. A width of the light flux striking the rotatable multi-faceted mirror is smaller than a length of a face of the rotatable multi-faceted mirror. The entire of light flux striking the rotatable multi-faceted mirror is reflected at a first face when the light flux reflected by the rotatable multi-faceted mirror is directed to the center portion of the scanning area. A part of the light flux striking the rotatable multi-faceted mirror is reflected at the first face while the remaining of the light flux is reflected at a second face when the light flux reflected by the rotatable multi-faceted mirror is directed to a least one of the two end portions of the scanning area.

10 Claims, 30 Drawing Sheets

(56) References Cited

U.S. PATENT DOCUMENTS

| | | | |
|---|---|---|---|
| 6,104,522 A | 8/2000 | Hayashi et al. | |
| 6,185,026 B1 | 2/2001 | Hayashi et al. | |
| 6,198,562 B1 | 3/2001 | Hayashi et al. | |
| 6,369,927 B2 | 4/2002 | Hayashi | |
| 6,400,391 B1 | 6/2002 | Suhara et al. | |
| 6,580,186 B1 | 6/2003 | Suzuki et al. | |
| 7,884,842 B2 * | 2/2011 | Ishihara | 347/235 |
| 8,189,027 B2 * | 5/2012 | Miyadera et al. | 347/261 |
| 2001/0013889 A1 | 8/2001 | Hayashi et al. | |
| 2001/0055139 A1 | 12/2001 | Hayashi | |
| 2002/0001118 A1 | 1/2002 | Nakajima et al. | |
| 2002/0030879 A1 | 3/2002 | Hayashi | |
| 2002/0039132 A1 | 4/2002 | Hayashi et al. | |
| 2002/0039222 A1 | 4/2002 | Hayashi | |
| 2002/0100869 A1 | 8/2002 | Hayashi | |
| 2002/0130948 A1 | 9/2002 | Itami et al. | |
| 2002/0149666 A1 | 10/2002 | Amada et al. | |
| 2002/0163704 A1 | 11/2002 | Hayashi et al. | |
| 2003/0002122 A1 | 1/2003 | Hayashi et al. | |
| 2003/0053156 A1 | 3/2003 | Satoh et al. | |
| 2003/0067533 A1 | 4/2003 | Omori et al. | |
| 2003/0072066 A1 | 4/2003 | Hayashi et al. | |
| 2003/0081299 A1 | 5/2003 | Suzuki et al. | |
| 2003/0107788 A1 | 6/2003 | Hayashi et al. | |
| 2003/0156310 A1 | 8/2003 | Suzuki et al. | |
| 2003/0160529 A1 | 8/2003 | Suzuki et al. | |
| 2003/0179428 A1 | 9/2003 | Suzuki et al. | |
| 2003/0206322 A1 | 11/2003 | Atsuumi et al. | |
| 2003/0214693 A1 | 11/2003 | Hayashi et al. | |
| 2004/0001241 A1 | 1/2004 | Hayashi et al. | |
| 2004/0036936 A1 | 2/2004 | Nakajima et al. | |
| 2004/0090520 A1 * | 5/2004 | Sakai et al. | 347/225 |
| 2004/0141219 A1 | 7/2004 | Ono et al. | |
| 2004/0165240 A1 | 8/2004 | Suzuki et al. | |
| 2004/0169905 A1 | 9/2004 | Hayashi et al. | |
| 2004/0179089 A1 | 9/2004 | Hayashi | |
| 2004/0184127 A1 | 9/2004 | Nakajima et al. | |
| 2004/0240000 A1 | 12/2004 | Miyatake et al. | |
| 2005/0018268 A1 | 1/2005 | Hayashi et al. | |
| 2005/0093955 A1 | 5/2005 | Izumi et al. | |
| 2005/0093962 A1 | 5/2005 | Miyatake et al. | |
| 2005/0094234 A1 | 5/2005 | Miyatake et al. | |
| 2005/0099663 A1 | 5/2005 | Hayashi | |
| 2005/0243396 A1 | 11/2005 | Fujii et al. | |
| 2006/0061847 A1 | 3/2006 | Itami | |
| 2006/0077500 A1 | 4/2006 | Hayashi et al. | |
| 2006/0203264 A1 | 9/2006 | Miyatake | |
| 2006/0208179 A1 | 9/2006 | Itami | |
| 2006/0209377 A1 | 9/2006 | Atsuumi et al. | |
| 2006/0232659 A1 | 10/2006 | Hayashi et al. | |
| 2006/0245009 A1 | 11/2006 | Akiyama et al. | |
| 2006/0284968 A1 | 12/2006 | Hayashi et al. | |
| 2006/0285187 A1 | 12/2006 | Ichii et al. | |
| 2006/0291026 A1 | 12/2006 | Miyatake | |
| 2007/0002417 A1 | 1/2007 | Hirakawa et al. | |
| 2007/0030538 A1 | 2/2007 | Hirakawa et al. | |
| 2007/0058255 A1 | 3/2007 | Imai et al. | |
| 2007/0091398 A1 | 4/2007 | Ueda et al. | |
| 2007/0146852 A1 | 6/2007 | Itami | |
| 2007/0153349 A1 | 7/2007 | Itami et al. | |
| 2007/0211324 A1 | 9/2007 | Sakai et al. | |
| 2007/0215800 A1 | 9/2007 | Miyatake et al. | |
| 2007/0216754 A1 | 9/2007 | Miyatake | |
| 2007/0253048 A1 | 11/2007 | Sakai et al. | |
| 2007/0297036 A1 | 12/2007 | Nakamura et al. | |
| 2008/0024849 A1 | 1/2008 | Hayashi et al. | |
| 2008/0025759 A1 | 1/2008 | Ichii et al. | |
| 2008/0055690 A1 | 3/2008 | Nakamura et al. | |
| 2008/0055692 A1 | 3/2008 | Saisho et al. | |
| 2008/0062491 A1 | 3/2008 | Nakamura et al. | |
| 2008/0068689 A1 | 3/2008 | Saisho et al. | |
| 2008/0068691 A1 | 3/2008 | Miyatake | |
| 2008/0068693 A1 | 3/2008 | Hayashi et al. | |
| 2008/0100895 A1 | 5/2008 | Hayashi et al. | |
| 2008/0123159 A1 | 5/2008 | Hayashi et al. | |
| 2008/0174843 A1 | 7/2008 | Masuda et al. | |
| 2008/0180772 A1 | 7/2008 | Miyatake et al. | |
| 2008/0192319 A1 | 8/2008 | Miyatake et al. | |
| 2008/0204539 A1 | 8/2008 | Itami et al. | |
| 2008/0204840 A1 | 8/2008 | Watanabe et al. | |
| 2008/0204841 A1 | 8/2008 | Suzuki et al. | |
| 2008/0204842 A1 | 8/2008 | Arai et al. | |
| 2008/0212999 A1 | 9/2008 | Masuda et al. | |
| 2008/0218827 A1 | 9/2008 | Watanabe et al. | |
| 2008/0219601 A1 | 9/2008 | Arai et al. | |
| 2008/0239432 A1 | 10/2008 | Itami | |
| 2008/0266633 A1 | 10/2008 | Hirakawa et al. | |
| 2008/0267662 A1 | 10/2008 | Arai et al. | |
| 2008/0267663 A1 | 10/2008 | Ichii et al. | |
| 2008/0284838 A1 | 11/2008 | Suzuki et al. | |
| 2008/0285104 A1 | 11/2008 | Arai et al. | |
| 2009/0052944 A1 | 2/2009 | Kubo et al. | |
| 2009/0060583 A1 | 3/2009 | Amada et al. | |
| 2009/0073528 A1 | 3/2009 | Miyatake | |
| 2009/0141316 A1 | 6/2009 | Arai et al. | |
| 2009/0168132 A1 | 7/2009 | Miyatake | |
| 2009/0175657 A1 | 7/2009 | Yoshii et al. | |
| 2009/0214261 A1 | 8/2009 | Hirakawa et al. | |
| 2009/0225148 A1 | 9/2009 | Itami et al. | |
| 2009/0231659 A1 | 9/2009 | Masuda et al. | |
| 2009/0251753 A1 | 10/2009 | Hirakawa et al. | |
| 2009/0315967 A1 | 12/2009 | Hayashi et al. | |
| 2010/0060712 A1 | 3/2010 | Sato et al. | |
| 2010/0091083 A1 | 4/2010 | Itami et al. | |
| 2010/0194843 A1 | 8/2010 | Sakai et al. | |
| 2010/0214633 A1 | 8/2010 | Sato et al. | |
| 2011/0063704 A1 | 3/2011 | Miyatake | |
| 2011/0110687 A1 | 5/2011 | Miyatake et al. | |
| 2012/0056968 A1 | 3/2012 | Imai et al. | |
| 2012/0177409 A1 | 7/2012 | Arai et al. | |
| 2012/0182367 A1 | 7/2012 | Masuda et al. | |
| 2012/0182373 A1 | 7/2012 | Hayashi | |
| 2012/0236380 A1 | 9/2012 | Miyatake et al. | |
| 2013/0083148 A1 | 4/2013 | Miyatake et al. | |

* cited by examiner

FIG. 12A

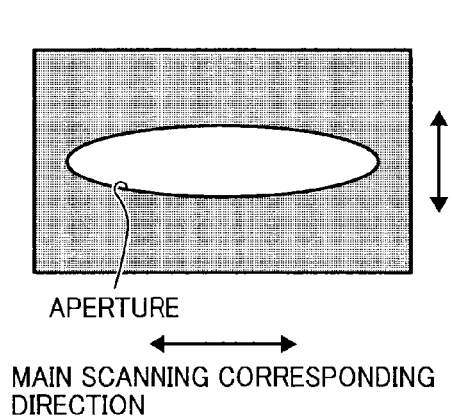

APERTURE

MAIN SCANNING CORRESPONDING DIRECTION

SUB-SCANNING CORRESPONDING DIRECTION

FIG. 12B

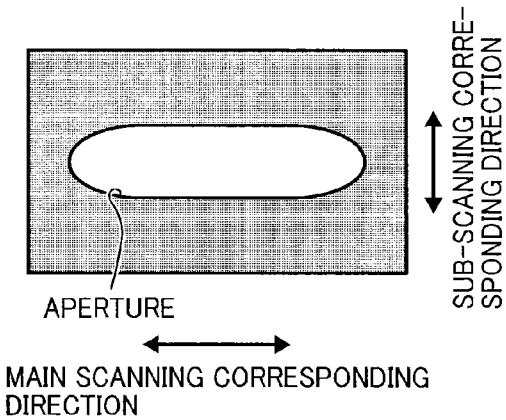

APERTURE

MAIN SCANNING CORRESPONDING DIRECTION

SUB-SCANNING CORRESPONDING DIRECTION

FIG. 12C

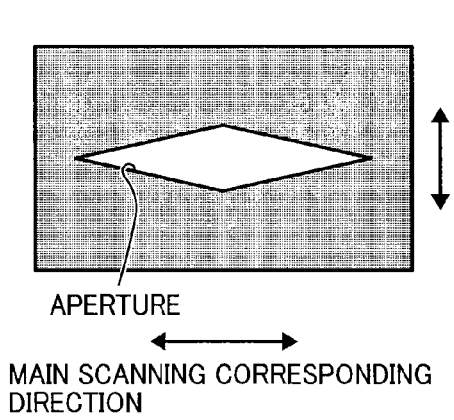

APERTURE

MAIN SCANNING CORRESPONDING DIRECTION

SUB-SCANNING CORRESPONDING DIRECTION

FIG. 12D

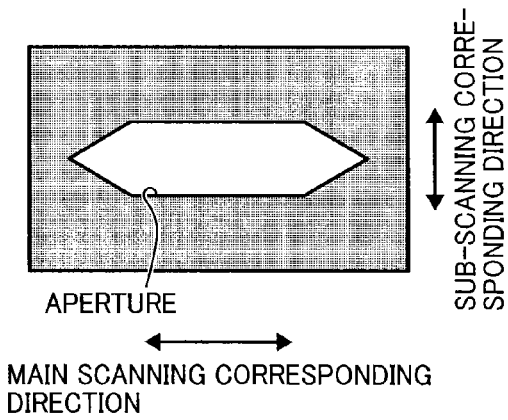

APERTURE

MAIN SCANNING CORRESPONDING DIRECTION

SUB-SCANNING CORRESPONDING DIRECTION

FIG. 34A
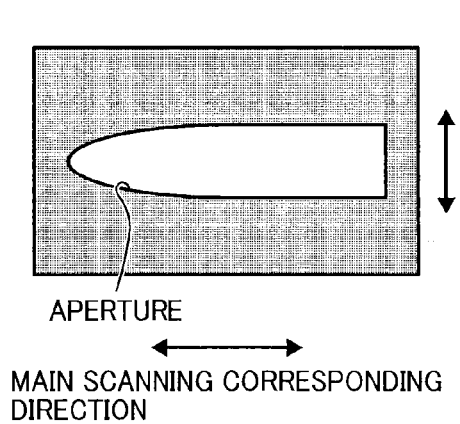
APERTURE
MAIN SCANNING CORRESPONDING DIRECTION
SUB-SCANNING CORRESPONDING DIRECTION FIG. 34B
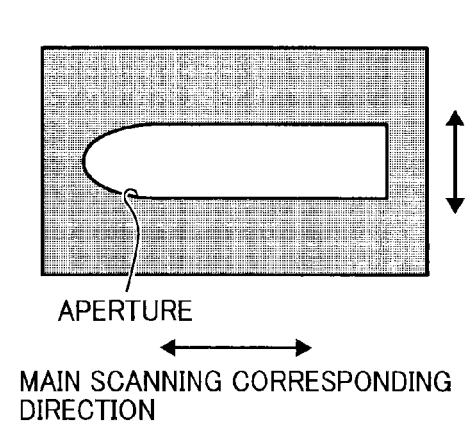
APERTURE
MAIN SCANNING CORRESPONDING DIRECTION
SUB-SCANNING CORRESPONDING DIRECTION FIG. 34C
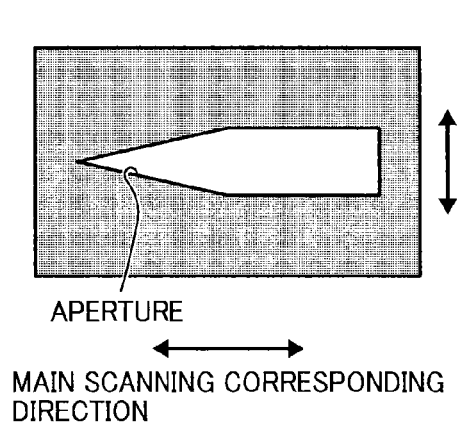
APERTURE
MAIN SCANNING CORRESPONDING DIRECTION
SUB-SCANNING CORRESPONDING DIRECTION FIG. 34D
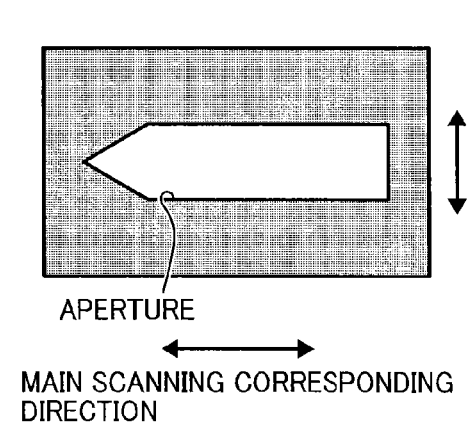
APERTURE
MAIN SCANNING CORRESPONDING DIRECTION
SUB-SCANNING CORRESPONDING DIRECTION

FIG. 39
(WHEN LIGHT FLUX HAVING P-POLARIZED LIGHT COMPONENT STRONGER THAN S-POLARIZED LIGHT COMPONENT ENTERS OPTICAL DEFLECTOR)
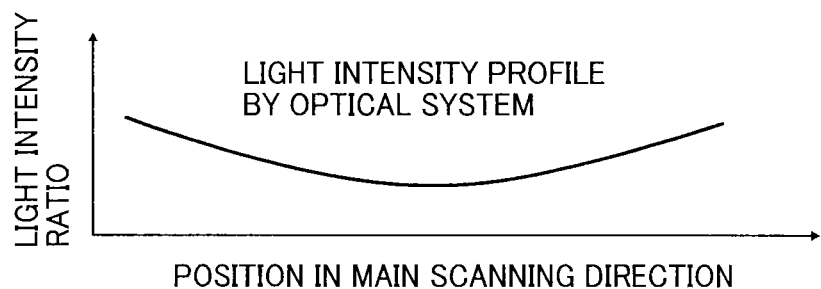
+
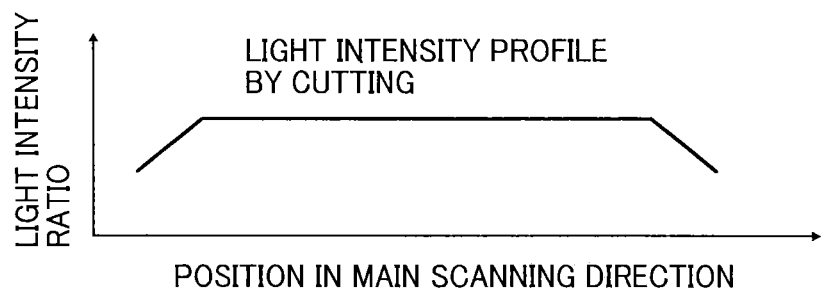
=
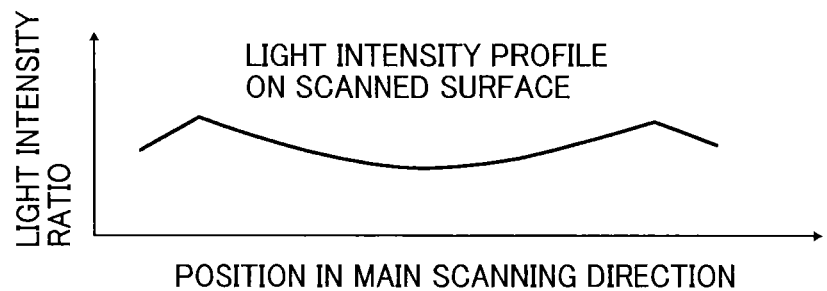

OPTICAL SCANNING UNIT AND IMAGE FORMING APPARATUS

CROSS-REFERENCE TO RELATED APPLICATION

This application claims priority pursuant to 35 U.S.C. §119 to Japanese Patent Application Nos. 2012-151306, filed on Jul. 5, 2012, and 2013-112429, filed on May 29, 2013 in the Japan Patent Office, the disclosure of which is incorporated by reference herein in their entirety.

BACKGROUND

1. Technical Field

The present invention relates to an optical scanning unit and an image forming apparatus, and more particularly to, an optical scanning unit that scans a scanned surface, and an image forming apparatus employing the optical scanning unit.

2. Background Art

When recording images, Image forming apparatuses using electrophotography typically include, for example, an optical scanning unit that scans a surface of a photoconductive drum using a laser beam to form a latent image on the surface of the photoconductive drum.

The optical scanning unit includes, for example, a light source, a pre-deflector optical system, a rotatable multi-faceted mirror, and a scanning optical system. The laser beam emitted from the light source strikes the rotatable multi-faceted mirror via the pre-deflector optical system, is deflected at the reflection face of the rotatable multi-faceted mirror, and is then guided to the photoconductive drum through the scanning optical system. The reflection face of the rotatable multi-faceted mirror is also referred to as the deflective reflection face.

The laser beam can be directed to the multi-faceted mirror using an underfilled (UF) type system or an overfilled (OF) type system.

JP-2005-92129-A discloses a UF type system, in which the incident light is narrower than a length of the deflective reflection face extending along a direction corresponding to the main scanning direction, and all the incident light is reflected at the deflective reflection face.

By contrast, JP-H10-206778-A discloses a OF type system, in which the incident light is wider than a length of the deflective reflection face extending along a direction corresponding to the main scanning direction, and the periphery of the incident light does not strike the deflective reflection face.

Image forming apparatuses are increasingly expected to operate at ever-faster speeds and provide enhanced quality images. However, with conventional image forming apparatuses, it is difficult to enhance image forming speed and image quality without increasing the size and cost of the apparatus.

SUMMARY

In one aspect of the present invention, an optical scanning unit is devised. The optical scanning unit includes a rotatable multi-faceted mirror having a plurality of reflection faces reflecting light flux emitted from a light source to scan a scanning area on a scanned surface in a main scanning direction. When the light flux is orthographically projected to a plane perpendicular to a rotation axis of the rotatable multi-face mirror, a width of the light flux striking the rotatable multi-faceted mirror is narrower than a length of a reflection face of the rotatable multi-faceted mirror extending along a direction corresponding to the main scanning direction. The entire of light flux striking the rotatable multi-faceted mirror is reflected at a first reflection face when the light flux reflected by the rotatable multi-faceted mirror is directed to the center portion of the scanning area. A part of the light flux striking the rotatable multi-faceted mirror is reflected at the first reflection face while the remaining portion of the light flux striking the rotatable multi-faceted mirror is reflected at a second reflection face when the light flux reflected by the rotatable multi-faceted mirror is directed to a least one of two end portions of the scanning area.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 12A to 12D show examples of the aperture plate used in the example embodiments;

FIGS. 34A to 34D show examples of aperture plate used for the variant examples.

FIG. 39 shows an example of the light intensity profile when light flux having P-polarized light component stronger than S-polarized light component enters a deflective reflection face of an optical deflector;

Figure 1:
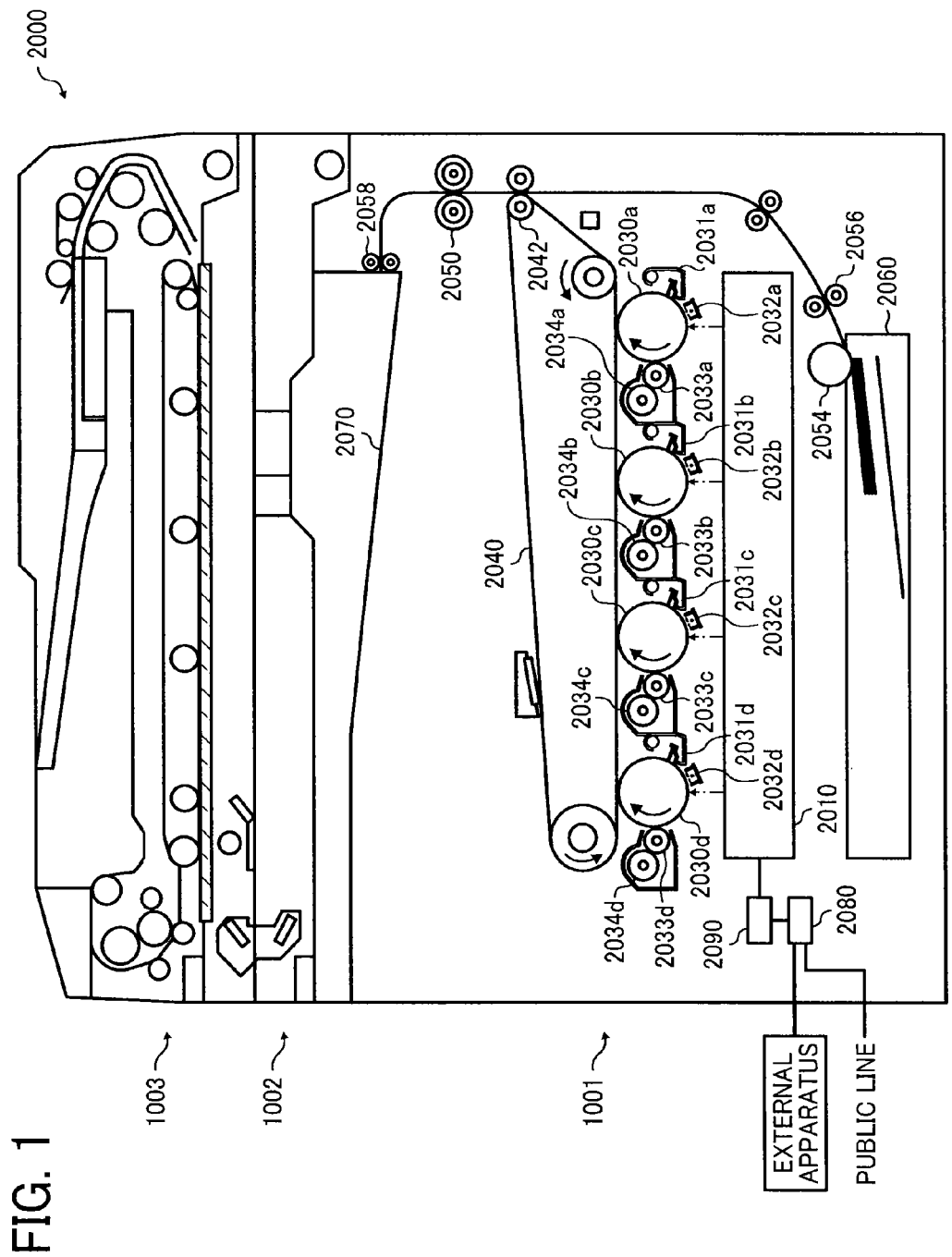
FIG. 1 is a schematic configuration of an image forming apparatuses according to an example embodiment of the present invention.
Figure 2:
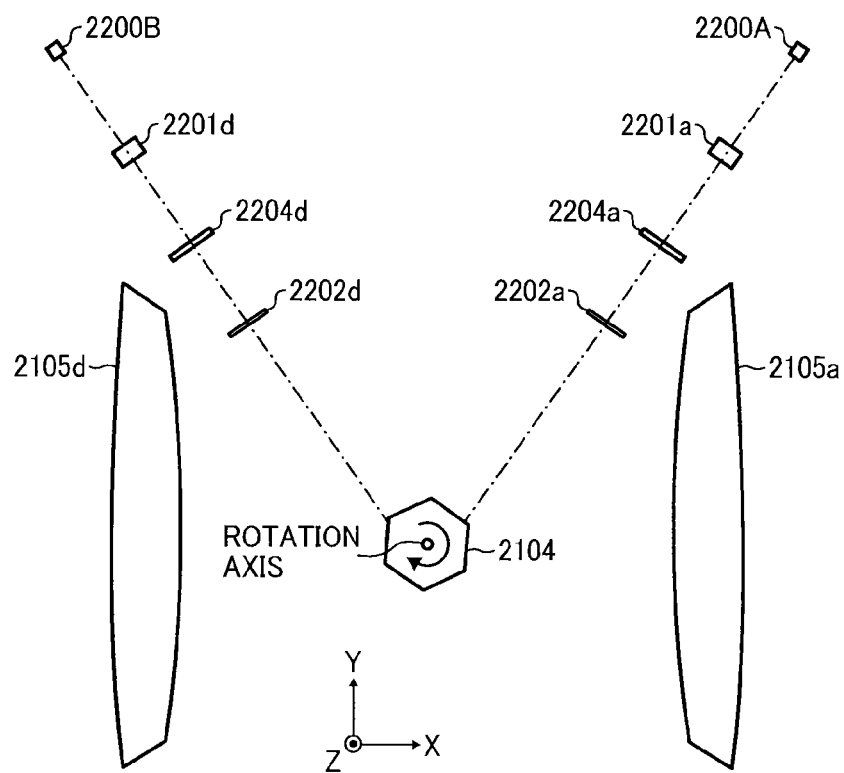
FIGS. 2, 3, 4 and 5 show schematic configurations of an optical scanning unit.
Figure 3:
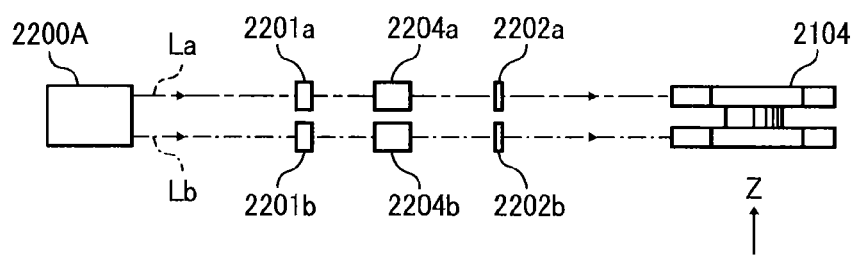
Figure 4:
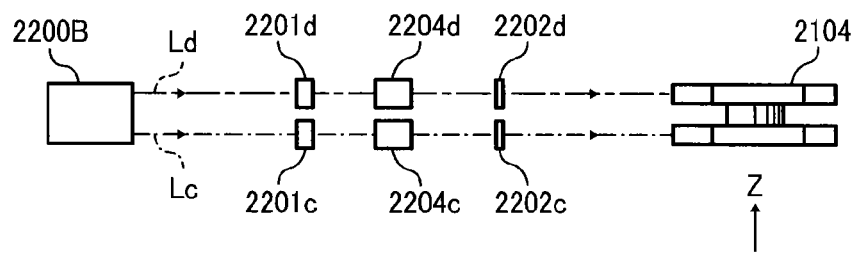
Figure 5:
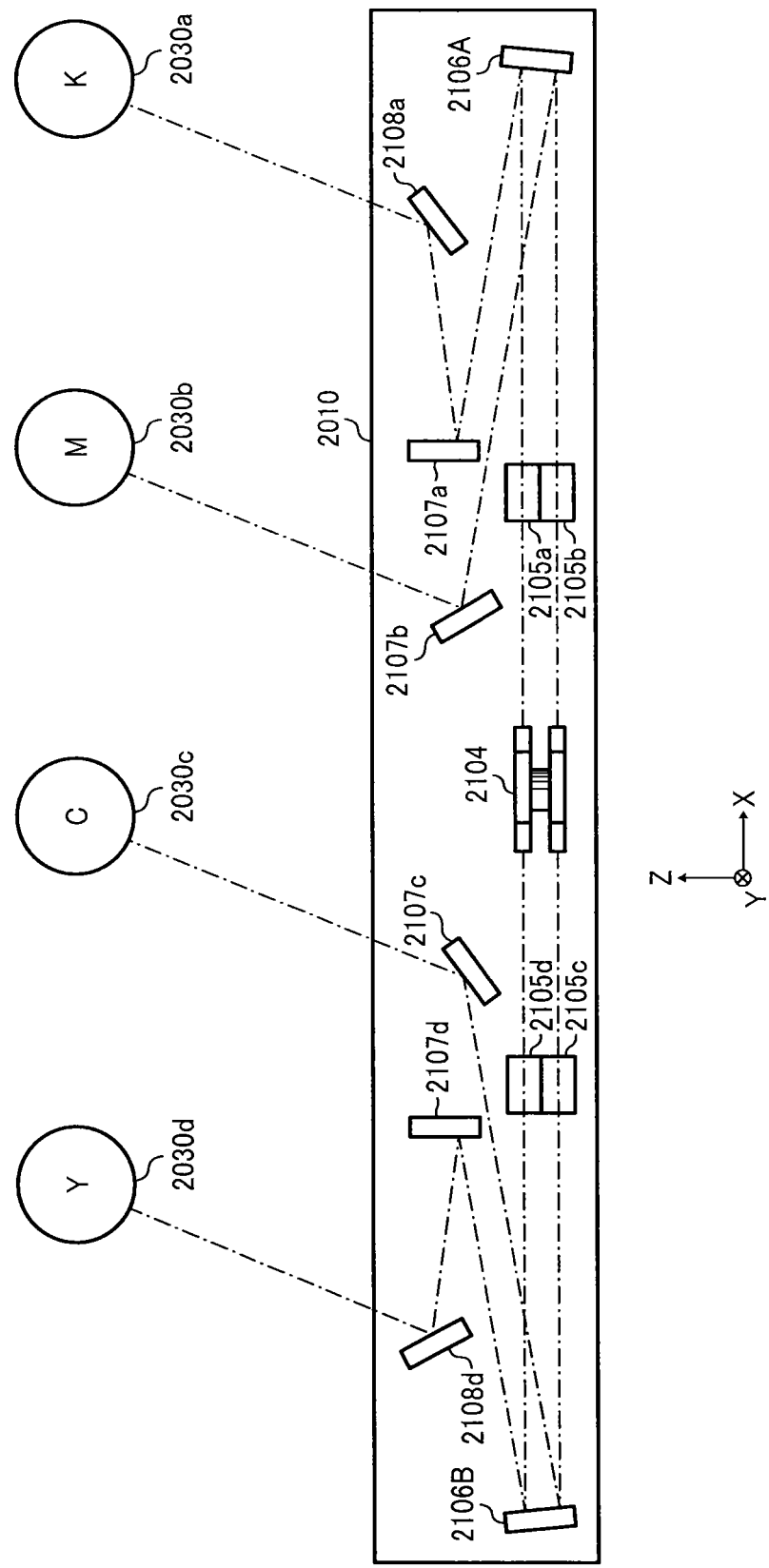

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have a similar function, operate in a similar manner, and achieve a similar result. Referring now to the drawings, apparatuses or systems according to example embodiments are described hereinafter with reference to FIGS. 1 to 25. In this disclosure, a scanning area means an area on a scanned surface such as a surface of photoconductive member where an image such as a latent image is formed by an optical scanning process.

FIG. 1 shows a schematic configuration of an image forming apparatus 2000 according to an example embodiment of the present invention.

The image forming apparatus 2000, which can be used as facsimile, printer and copier, includes, for example, a main unit 1001, a scan unit 1002, and an automatic document feeder 1003. As such, the image forming apparatus 2000 may be, for example, a multi-functional apparatus, but not limited hereto.

The main unit 1001 is, for example, a multi-color printer employing a tandem system which can form a full-color image by superimposing four colors such as black, cyan, magenta, and yellow. The main unit 1001 includes, for example, an optical scanning unit 2010, four photoconductors 2030a, 2030b, 2030c, 2030d, four cleaning units 2031a, 2031b, 2031c, 2031d, four chargers 2032a, 2032b, 2032c, 2032d, four development rollers 2033a, 2033b, 2033c, 2033d, an intermediate transfer belt 2040, a transfer roller 2042, a fusing roller 2050, a sheet-feed roller 2054, a sheet-ejection roller 2058, a sheet tray 2060, a sheet-ejection tray 2070, a communication controller 2080, and an apparatus controller 2090 that controls above each unit as a whole.

The scan unit 1002 may be disposed above the main unit 1001 to scan documents. The scan unit 1002 is used as a scanner. Image information scanned by the scan unit 1002 is transmitted to the apparatus controller 2090 of the main unit 1001.

The automatic document feeder 1003 may be disposed above the scan unit 1002 to feed document sheets set on the automatic document feeder 1003. The automatic document feeder 1003 may be known as an auto document feeder (ADF).

The communication controller 2080 controls bi-directional communications with external apparatuses such as personal computers via a network, and data communication via a public line.

The apparatus controller 2090 includes, for example, a central processing unit (CPU), a read only memory (ROM), a random access memory (RAM), and an analog/digital (A/D) converter. The ROM stores software programs using coding readable by the CPU, and data to be used with the software programs. The RAM can be used as a working memory. The A/D converter converts analog data to digital data. Further, the apparatus controller 2090 can receive image information from the external apparatuses via the communication controller 2080 or from the scan unit 1002, and then transmits such image information via to the optical scanning unit 2010.

The photoconductor 2030a, the charger 2032a, the development roller 2033a, and the cleaning unit 2031a are assembled as an image forming station to form an image of black (hereinafter, K station).

The photoconductor 2030b, the charger 2032b, the development roller 2033b, and the cleaning unit 2031b are assembled as an image forming station to form an image of magenta cyan (hereinafter, M station).

The photoconductor 2030c, the charger 2032c, the development roller 2033c, and the cleaning unit 2031c are assembled as an image forming station to form an image of cyan (hereinafter, C station).

The photoconductor 2030d, the charger 2032d, the development roller 2033d, and the cleaning unit 2031d are assembled as an image forming station to form an image of yellow (hereinafter, Y station).

Each of the photoconductors has a photoconductive layer as a surface layer. Each of the photoconductors can be rotated in a direction shown by an arrow in FIG. 1 by a driving unit.

Each of the chargers charges the surface of corresponding photoconductor uniformly.

Based on multi-color image information such as black, cyan, magenta, and yellow image information received from the apparatus controller 2090, the optical scanning unit 2010 generates a modulated light beam for each color to scan a corresponding charged photoconductor drum using the modulated light beam, by which a latent image corresponding to each color image information can be formed on the corresponding photoconductor drum. Therefore, the surface of each photoconductor drum is used as a scanned surface. Further, photoconductor drum is used as an image bearing member or image carrying member. Therefore, the surface of each photoconductor drum is referred to as the scanned face or the image face, hereinafter. As the photoconductor drum rotates, such latent image is moved to a position facing a corresponding development roller. The optical scanning unit 2010 will be described in detail later.

Each development roller is supplied with corresponding color toner, supplied from a corresponding toner cartridge, as the development roller rotates to form a thin layer of toner uniformly on the surface of the development roller. When the toner on the development roller contacts the surface of corresponding photoconductor drum, toner moves only to the light-exposed portion on the surface of photoconductor drum, and adheres on such portion. As such, each development roller supplies toner to the latent image formed on the surface of corresponding photoconductor drum to develop the latent image as a toner image. The toner image is transferred to the intermediate transfer belt 2040 as the photoconductor drum rotates.

Yellow, magenta, cyan, and black toner images are sequentially superimposed on the intermediate transfer belt 2040 at a given timing to form a color image.

The sheet tray 2060 stores recording media such as recording sheets. The sheet-feed roller 2054 disposed near the sheet tray 2060 can be used to feed out the recording sheets one by one from the sheet tray 2060. The recording sheet can be fed to a nip between the transfer belt 2040 and the transfer roller 2042 at a given timing to transfer the color image from the intermediate transfer belt 2040 to the recording sheet. Then, the recording sheet transferred with the color image is fed to the fusing roller 2050.

The fusing roller 2050 applies heat and pressure to the recording sheet to fuse the toner on the recording sheet. Upon fusing the toner image, the recording sheet is transported to the sheet-ejection tray 2070 via the sheet-ejection roller 2058, and stacked on the sheet-ejection tray 2070 one by one.

Each of the cleaning unit removes remaining toner from the surface of corresponding photoconductor drum. Upon removing the remaining toner, the photoconductor drum can be set at a position facing the corresponding charger again.

A description is given of a configuration of the optical scanning unit 2010. As shown in FIGS. 2, 3, 4, and 5, and the optical scanning unit 2010 includes, for example, two light sources 2200A, 2200B, four coupling lenses 2201a, 2201b, 2201c, 2201d, four aperture plates 2202a, 2202b, 2202c, 2202d, four cylindrical lenses 2204a, 2204b, 2204c, 2204d, an optical deflector 2104, four scan lenses 2105a, 2105b, 2105c, 2105d, eight reflection mirrors 2106A, 2106B, 2107a, 2107b, 2107c, 2107d, 2108a, 2108d, and a scan controller, and such units and devices are installed in an optical housing.

In this description, X, Y, Z three-dimensional orthogonal coordinate system is used, in which the long side direction of each photoconductor drum (i.e., rotation axis direction) is aligned to the Y-axis direction, and the rotation axis direction of the polygon mirror 2104 is aligned to the Z-axis direction. Therefore, the Z-axis direction is parallel to the rotation axis direction of the optical deflector 2104.

Hereinafter, for the simplicity of expression, a direction of each optical part corresponding to the main scanning direction on the photoconductor drum is referred to as "main scanning corresponding direction," and a direction of each optical part corresponding to the sub-scanning direction on the photoconductor drum is referred to as "sub-scanning corresponding direction".

The light source 2200A and light source 2200B are arranged at given locations while maintaining a given distance with each other in the X-axis direction. Each of the light source 2200A and light source 2200B includes two light emitting elements, in which the two light emitting elements are arranged at given locations while maintaining a given distance with each other in the Z-axis direction In this description, the light source 2200A emits two light fluxes such as a light flux La at +Z side and a light flux Lb at −Z side, and the light source 2200B emits two light fluxes such as a light flux Ld at +Z side and a light flux Lc at −Z side.

The coupling lens 2201a is disposed on the optical path of the light flux La emitted from the light source 2200A, and sets the light flux La to a substantially parallel light flux.

The coupling lens 2201b is disposed on the optical path of the light flux Lb emitted from the light source 2200A, and sets the light flux Lb to a substantially parallel light flux.

The coupling lens 2201c is disposed on the optical path of the light flux Lc emitted from the light source 2200B, and sets the light flux Lc to a substantially parallel light flux.

The coupling lens 2201d is disposed on the optical path of the light flux Ld emitted from the light source 2200B, and sets the light flux Ld to a substantially parallel light flux.

The cylindrical lens 2204a is disposed on the optical path of the light flux La via the coupling lens 2201a, and focuses the light flux La in the Z-axis.

The cylindrical lens 2204b is disposed on the optical path of the light flux Lb via the coupling lens 2201b, and focuses the light flux Lb in the Z-axis.

The cylindrical lens 2204c is disposed on the optical path of the light flux Lc via the coupling lens 2201c, and focuses the light flux Lc in the Z-axis.

The cylindrical lens 2204d is disposed on the optical path of the light flux Ld via the coupling lens 2201d, and focuses the light flux Ld in the Z-axis.

The aperture plate 2202a has an aperture used for shaping the light flux La coming from the cylindrical lens 2204a.

The aperture plate 2202b has an aperture used for shaping the light flux Lb coming from the cylindrical lens 2204b.

The aperture plate 2202c has an aperture used for shaping the light flux Lc coming from the cylindrical lens 2204c.

The aperture plate 2202d has an aperture used for shaping the light flux Ld coming from the cylindrical lens 2204d.

The light fluxed passing through the aperture of each of the aperture plates enters the optical deflector 2104.

The optical system from each of the light sources to optical elements disposed on the optical path before the optical deflector 2104 is referred to a pre-deflector optical system.

The optical deflector 2104 is, for example, a rotatable multi-faceted mirror of two stages having a double deck configuration. The optical deflector 2104 may be a polygon mirror. Each stage of the rotatable multi-faceted mirror has, for example, six mirror faces, and each mirror face is a deflective reflection face. At the first stage or lower stage rotatable multi-faceted mirror, the light flux Lb passing through the aperture of the aperture plate 2202b and the light flux Lc passing through the aperture of the aperture plate 2202c are deflected. At the second stage or upper stage rotatable multi-faceted mirror, the light flux La passing through the aperture of the aperture plate 2202a and the light flux Ld passing through the aperture of the aperture plate 2202d are deflected.

Further, the light flux La and the light flux Lb are deflected in the +X side of the optical deflector 2104, and the light flux Lc and the light flux Ld are deflected in –X side of the optical deflector 2104.

The scan lens 2105a and the scan lens 2105b are disposed on the +X side of the optical deflector 2104, and the scan lens 2105c and the scan lens 2105d are disposed on the –X side of the optical deflector 2104.

The scan lens 2105c and the scan lens 2105d are stacked in the Z-axis direction. The scan lens 2105a faces the second stage rotatable multi-faceted mirror, and the scan lens 2105b faces the first stage rotatable multi-faceted mirror. The scan lens 2105c and the scan lens 2105d are stacked in the Z-axis direction. The scan lens 2105c faces the first stage rotatable multi-faceted mirror, and the scan lens 2105d faces the second stage rotatable multi-faceted mirror.

The light flux La deflected by the optical deflector 2104 is irradiated onto the photoconductive drum 2030a via the scan lens 2105a, the reflection mirror 2106A, the reflection mirror 2107a, and the reflection mirror 2108a to form beam spots.

The light flux Lb deflected by the optical deflector 2104 is irradiated onto the photoconductive drum 2030b via the scan lens 2105b, the reflection mirror 2106A, and the reflection mirror 2107b to form beam spots.

The light flux Lc deflected by the optical deflector 2104 is irradiated onto the photoconductive drum 2030c via the scan lens 2105c, the reflection mirror 2106B, and the reflection mirror 2107c to form beam spots.

The light flux Ld deflected by the optical deflector 2104 is irradiated onto the photoconductive drum 2030d via the scan lens 2105d, the reflection mirror 2106B, the reflection mirror 2107d, and the reflection mirror 2108d to form beam spots.

The plurality of beam spots can be formed on the surface of each photoconductor drum along the axis direction (or long side direction) of each photoconductor drum as the optical deflector 2104. The forming direction of beam spots corresponds to the main scanning direction (or a first direction), and the rotation direction of the photoconductor drum corresponds to the sub-scanning direction (or a second direction).

The optical system disposed on the optical paths between the optical deflector 2104 and the photoconductive drums is referred to a scanning optical system.

Figure 6:
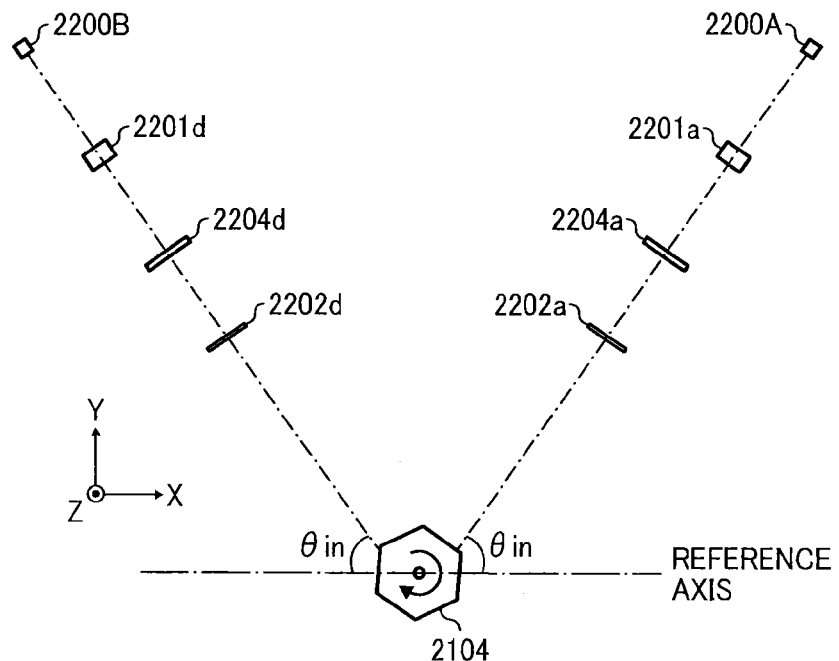
FIG. 6 shows a schematic configuration of a pre-deflector optical system and an optical deflector.
Figure 7:
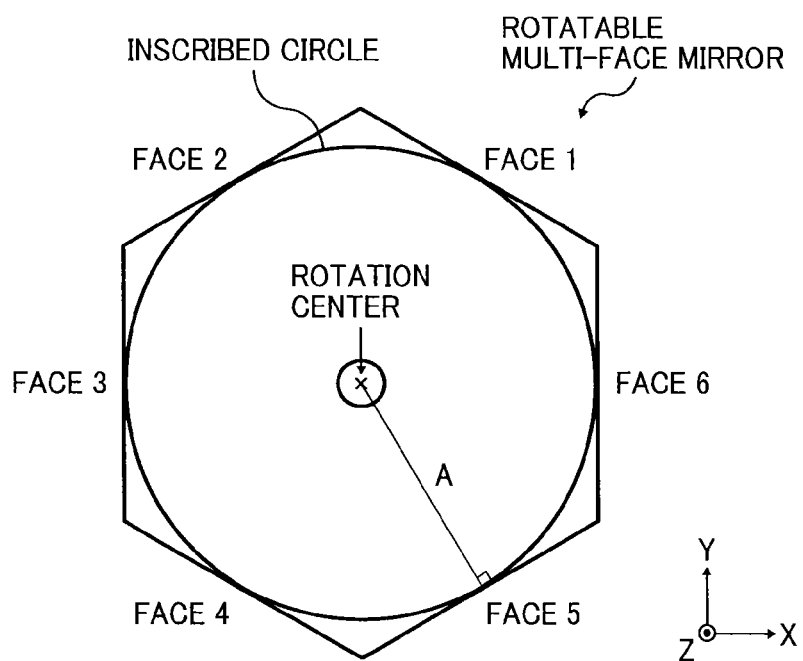
FIG. 7 shows a schematic view of an inscribed circle of a rotatable multi-faceted mirror.

As shown in FIG. 6, when the optical deflector 2104 is viewed from the Z-axis direction, an axis passing the rotation center of the rotatable multi-faceted mirror and extending in parallel to the X-axis is used as a reference axis.

When the optical deflector 2104 is viewed from the Z-axis direction, an angle set by the reference axis and the progression direction of the light flux emitted from the light source and entering the deflective reflection face is defined as an angle θin. For example, θin=55.0 degrees is set.

Figure 8:
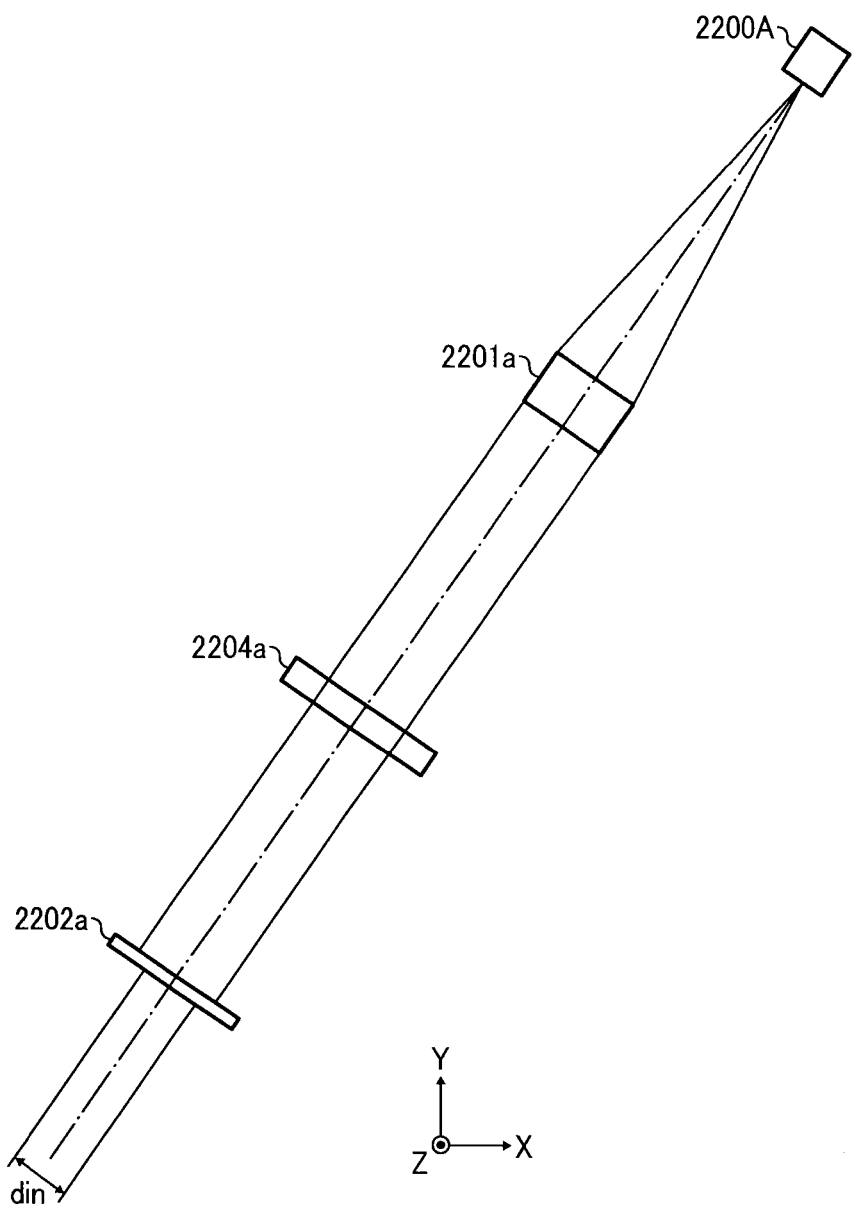
FIG. 8 shows a schematic view of light flux to enter an optical deflector with a light flux width din.

Further, as shown in FIG. 8, when viewed from the Z-axis direction, when the light flux passes through the aperture of the aperture plate 2202a, a width of the light flux becomes "din," and then the light flux enters the optical deflector 2104. For example, din=3.8 mm is set.

A diameter of an inscribed circle of the rotatable multi-faceted mirror (FIG. 7) is, for example, 18 mm, in which the normal line extending from the rotation center of the rotatable multi-faceted mirror to each deflective reflection face has a length of 9 mm. Further, if each of six deflective reflection faces is required to be distinguished with each other, each face is referred to face 1, face 2, face 3, face 4, face 5, and face 6 in the counter-clock direction.

Figure 9:
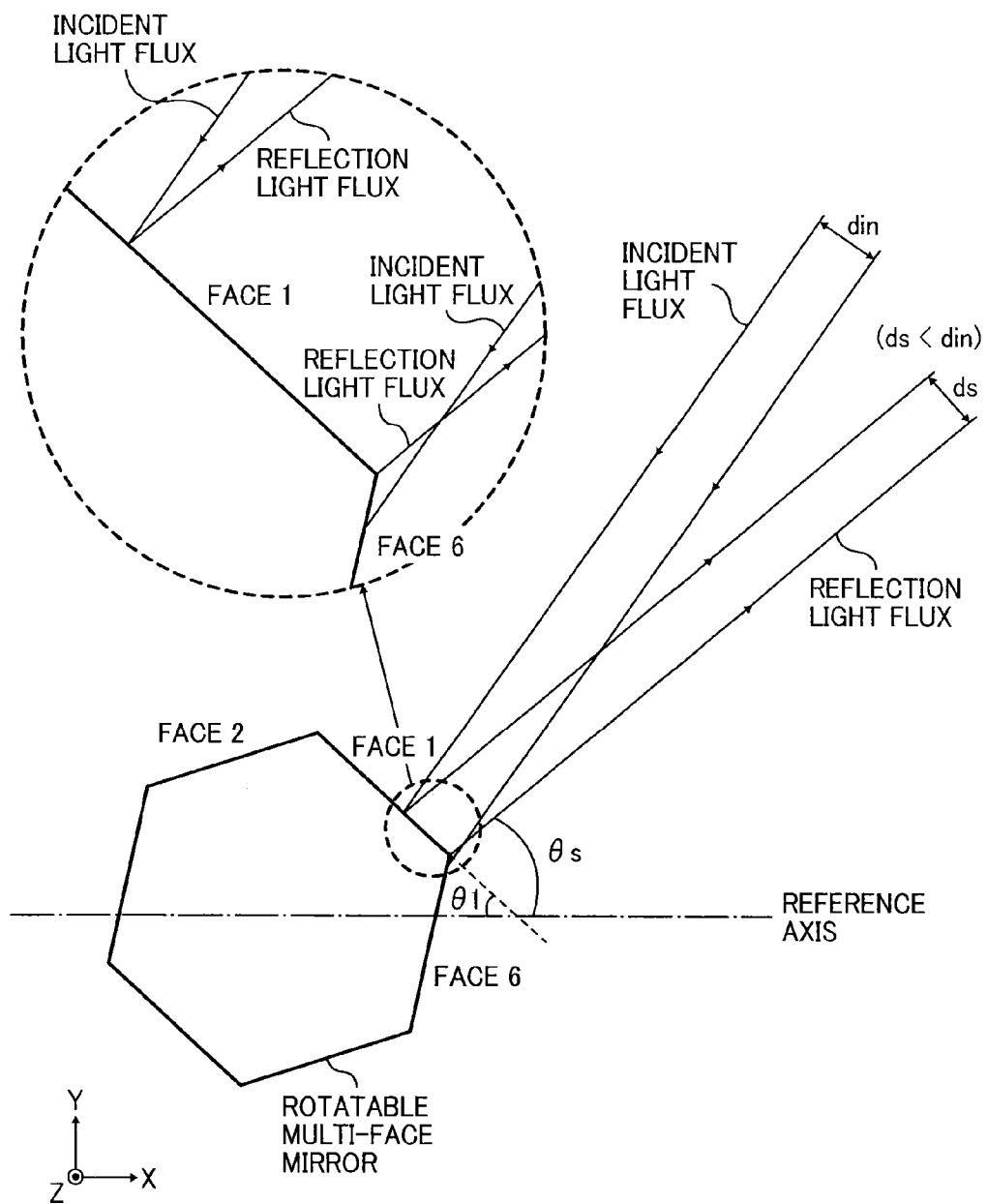
FIG. 9 shows an incident light flux and a reflection light flux with respect to an optical deflector when the light flux deflected by the optical deflector is directed to a scanning start position for a scanning area of a corresponding photoconductive drum.
Figure 10:
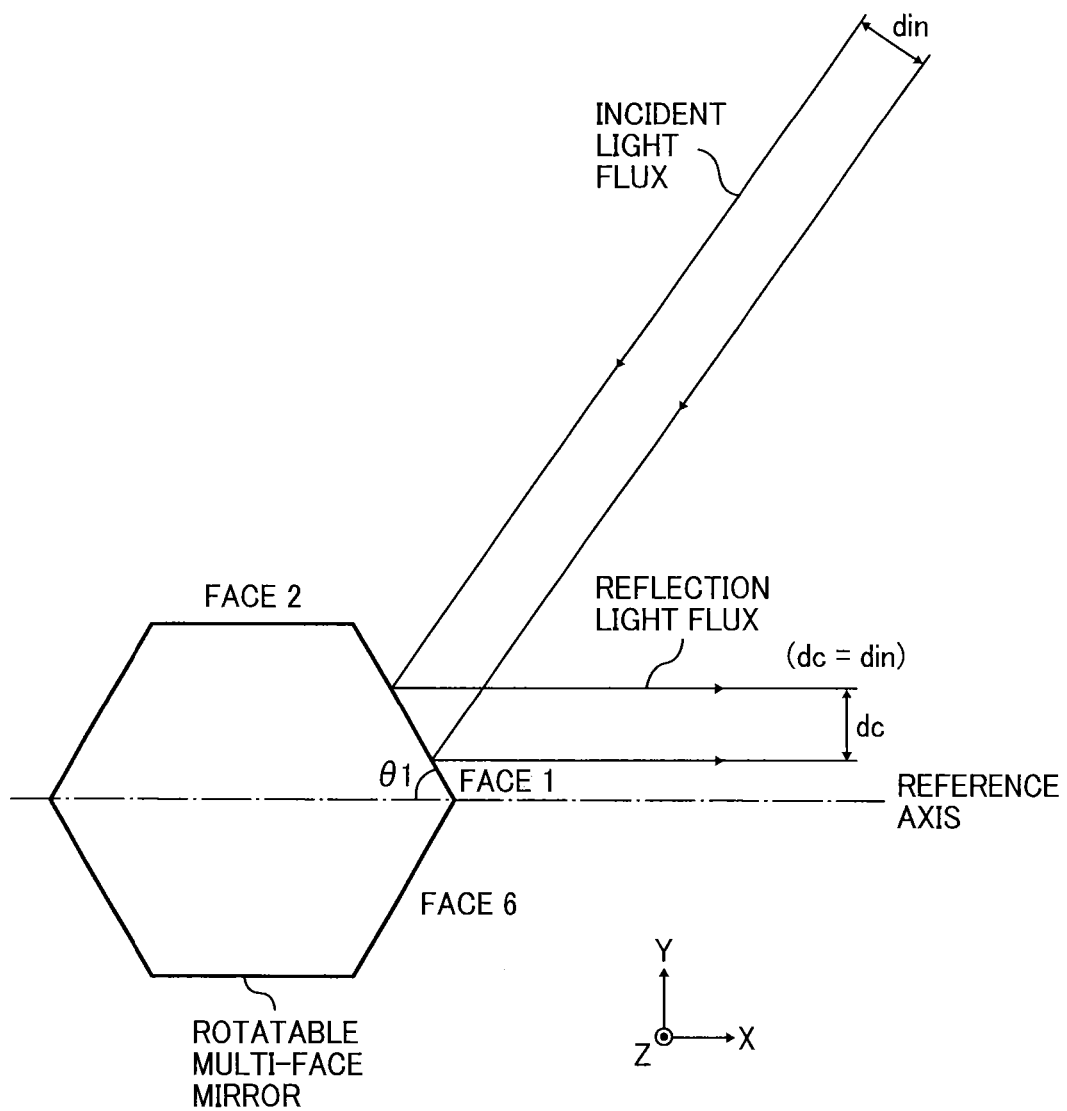
FIG. 10 shows an incident light flux and a reflection light flux with respect to an optical deflector when the light flux deflected by the optical deflector is directed to the center position of the scanning area of the corresponding photoconductive drum.
Figure 11:
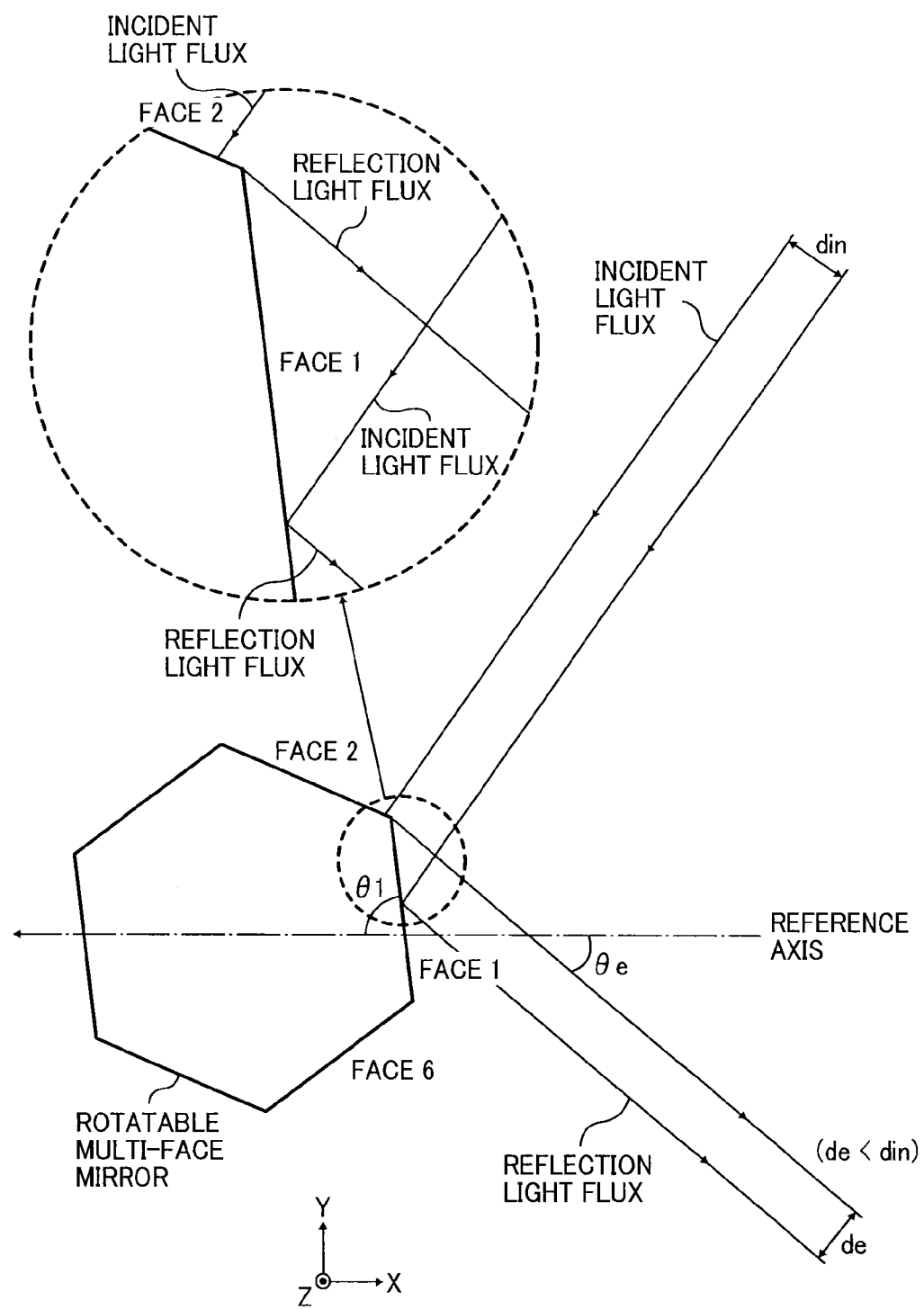
FIG. 11 shows an incident light flux and a reflection light flux with respect to an optical deflector when the light flux deflected by the optical deflector is directed to a scanning end position for a scanning area of the corresponding photoconductive drum.

A description is given of light flux emitted from the light source 2200A and entering the optical deflector 2104, and light flux deflected by the optical deflector 2104 with reference to FIG. 9 to FIG. 11. The light flux reflected at the face 1 of the rotatable multi-faceted mirror is directed to a scanning area of the corresponding photoconductive drum.

FIG. 9 shows an incident light flux and a reflection light flux with respect to the optical deflector 2104 such as the rotatable multi-faceted mirror when the light flux deflected by the optical deflector 2104 is directed to a scanning start position for a scanning area of the corresponding photoconductive drum. In this case, not all of the light flux entering the optical deflector 2104 enters the face 1 of the rotatable multi-faceted mirror, but it is designed that a part of the light flux entering the optical deflector 2104 strikes the face 6. Therefore, the width "ds" of the light flux reflected by the face 1 of the rotatable multi-faceted mirror and directed to the scanning start position of the corresponding photoconductive drum becomes smaller than the width "din" of the light flux entering the optical deflector 2104 (ds<din). In this case, a part of the incident light flux is cut at the optical deflector 2104. For example, ds=3.5 mm is set.

The progression direction of the light flux reflected at the face 1 of the rotatable multi-faceted mirror and the reference axis form an angle θs such as 40.0 degrees. Further, the inclined angle θ1 of the face 1 with respect to the reference axis is, for example, 42.5 degrees.

FIG. 10 shows an incident light flux and a reflection light flux with respect to the optical deflector 2104 such as the rotatable multi-faceted mirror when the light flux deflected by the optical deflector 2104 is directed to the center position of the scanning area of the corresponding photoconductive drum. In this case, it is designed that the entire light flux entering the optical deflector 2104 strikes the face 1 of the rotatable multi-faceted mirror. Therefore, the width "dc" of the light flux reflected at the face 1 of the rotatable multi-faceted mirror and directed to the center position of the scanning area of the corresponding photoconductive drum becomes same as the width "din" of the light flux entering the optical deflector 2104 (dc=din). In this case, the incident light flux is not cut at the optical deflector 2104. Further, the inclined angle θ1 of the face 1 with respect to the reference axis is, for example, 62.5 degrees.

FIG. 11 shows an incident light flux and a reflection light flux with respect to the optical deflector 2104 such as the rotatable multi-faceted mirror when the light flux deflected by the optical deflector 2104 is directed to a scanning end position for a scanning area of the corresponding photoconductive drum. In this case, it is designed that not all of the light flux entering the optical deflector 2104 strikes the face 1 of the rotatable multi-faceted mirror, but a part of the light flux entering the optical deflector 2104 enter the face 2 of the rotatable multi-faceted mirror. Therefore, the width "de" of the light flux reflected at the face 1 of the rotatable multi-faceted mirror and directed to the scanning end position of the corresponding photoconductive drum becomes smaller than the width "din" of the light flux entering the optical deflector 2104 (de<din). In this case, a part of the incident light flux is cut at the optical deflector 2104. For example, de=3.5 mm is set.

The progression direction of the light flux reflected at the face 1 of the rotatable multi-faceted mirror and the reference axis form an angle θe such as 40.0 degrees. Further, the inclined angle θ1 of the face 1 with respect to the reference axis is, for example, 82.5 degrees.

A sum of θs and θe (i.e., θs+θe) corresponds to a scanning angle, and the scanning angle is, for example, 80.0 degrees in the above described case. The scanning angle is composed of θs and θe, and each value of θs and θe can be variably set.

The scanning start position for the scanning area of the photoconductive drum is at one end of the scanning area in the main scanning direction, and the scanning end position for the scanning area of the photoconductive drum is at another end of the scanning area in the main scanning direction.

Further, the light flux emitted from the light source 2200B, entering the optical deflector 2104 and deflected by the optical deflector 2104 is set same as the light flux emitted from the light source 2200A.

FIGS. 12A to 12D show examples of aperture plates used in the example embodiments of the present invention, in which an aperture of the aperture plate has following shape. Specifically, a length (or opening width) of the aperture in the sub-scanning corresponding direction is small at the two end portions compared to the center portion in the main scanning corresponding direction. With this configuration, difference of the light intensity of beam spots between the two end portions and the center portion of the scanning area and a difference of diameters of beam spots between the two end portions and the center portion of the scanning area can be smaller.

Figure 13A:
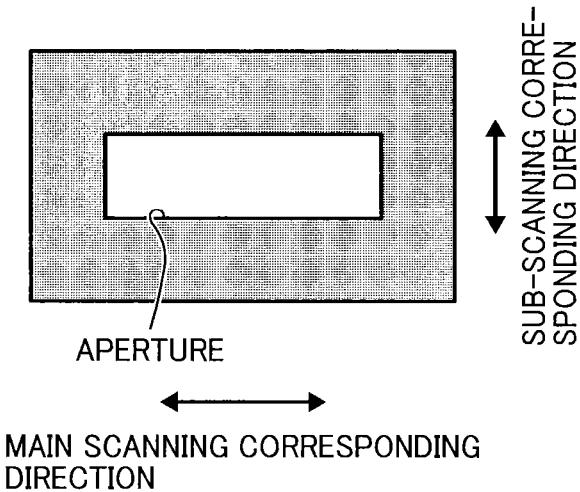
FIGS. 13A and 13B show aperture plates used for conventional optical scanning units.
Figure 13B:
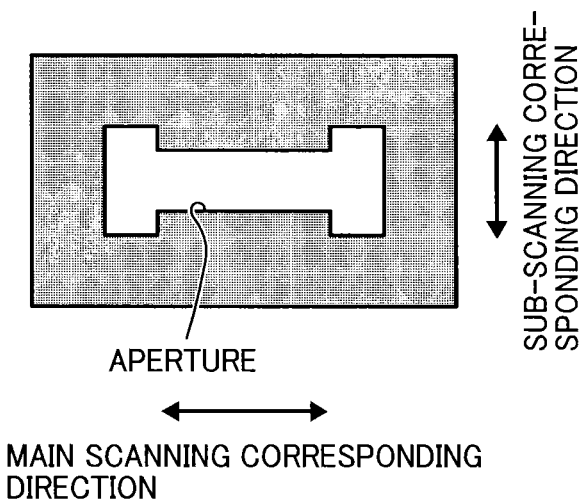

As comparative examples, FIG. 13A shows an aperture plate used for an optical scanning unit of conventional UF type, and FIG. 13B shows an aperture plate used for an optical scanning unit of conventional OF type.

When the optical scanning unit of conventional UF type is used to cope with high speed image forming and higher density of pixels, a length of the deflective reflection face in the main scanning corresponding direction is required to be greater. Therefore, the number of faces of the rotatable multi-faceted mirror is required to be decreased, or a diameter of a circumscribed circle of the rotatable multi-faceted mirror is required to be increased.

However, if the number of faces of the rotatable multi-faceted mirror is decreased, the rotation speed of the rotatable multi-faceted mirror is required to be increased, which is not preferable. Further, if the diameter of the circumscribed circle is increased, wind loss of the rotatable multi-faceted mirror increases, and thereby power consumption increases, which is not preferable.

Further, a configuration to increase the number of light sources and to increase the number of light beams deflected by one deflective reflection face can be considered. However, as the number of light sources increases, a drive circuit for the light sources becomes greater and a cost of the drive circuit increases.

Further, when the optical scanning unit of conventional OF type is used to cope with high speed image forming and higher density of pixels, the rotatable multi-faceted mirror having ten faces or more is required, by which the scan angle becomes small, and the size of the optical scanning unit increases, which is not preferable. Further, because the peripheral of light flux is not used, the light use efficiency becomes low, which is not preferable.

The optical scanning unit 2010 according to the example embodiment can design the rotatable multi-faceted mirror smaller than the optical scanning unit of conventional UF type. Therefore, as for the optical scanning unit 2010, without increasing the power consumption and the number of light sources, the rotatable multi-faceted mirror can be rotated with a high speed, which means without increasing the cost, high speed image forming and higher density of pixels can be conducted.

Further, the optical scanning unit 2010 according to the example embodiment can design the scan angle greater than the optical scanning unit of conventional OF type. Therefore, without increasing the size of the optical scanning unit 2010, high speed image forming and higher density of pixels can be conducted.

When a beam diameter on the surface of the photoconductor drum in the main scanning direction is to set, for example, from 60 μm to 100 μm or so, a width of the light flux (light flux width) deflected by the optical deflector in the main scanning corresponding direction is required to be from 3 mm to 4 mm or so.

In the following description, a width of light flux in the main scanning direction that irradiates the end portion of the scanning area of the photoconductive drum is defined as the light flux width "d1," and a width of light flux in the main scanning direction that irradiates the center portion of the scanning area of the photoconductive drum is defined as the light flux width "d2." Further, when viewed from the Z-axis direction, a length of the normal line extending from the rotation center of the rotatable multi-faceted mirror to the deflective reflection face is defined the length A. The length A is same as the radius of the inscribed circle (FIG. 7) of the rotatable multi-faceted mirror.

FIGS. 14 to 17 show relationships of d2/d1, and the angle θs or θe when d1=3.0 mm is used.

Figure 14:
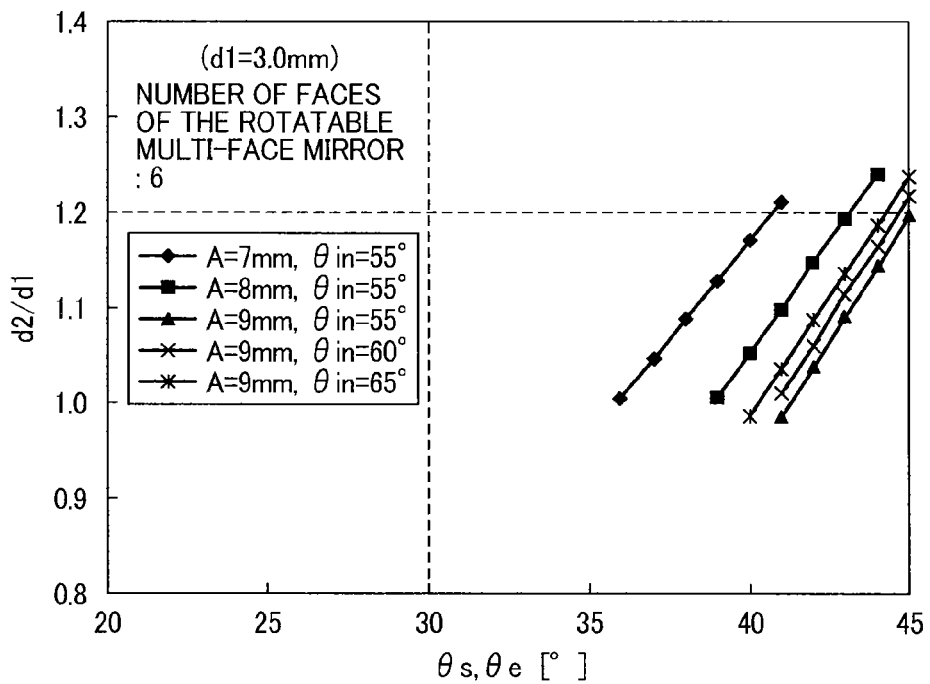
FIG. 14 shows a relationship of d2/d1 and an angle θs or θe when the number of faces of the rotatable multi-faceted mirror is six and d1=3.0 mm.

FIG. 14 shows a relationship of d2/d1 and the angle θs or θe when the number of faces of the rotatable multi-faceted mirror is six (6) faces, using cases of A=7 mm, θin=55 degrees; A=8 mm, θin=55 degrees; A=9 mm, θin=55 degrees; A=9 mm, θin=60 degrees; and A=9 mm, θin=65 degrees.

Figure 15:
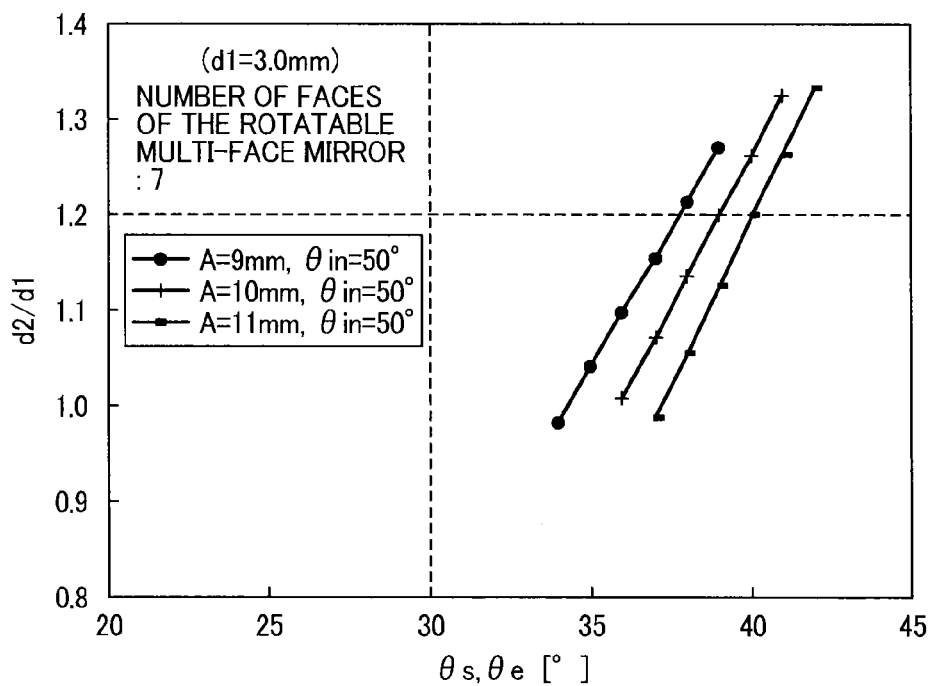
FIG. 15 shows a relationship of d2/d1 and the angle θs or θe when the number of faces of the rotatable multi-faceted mirror is seven and d1=3.0 mm.

FIG. 15 shows a relationship of d2/d1 and the angle θs or θe when the number of faces of the rotatable multi-faceted mirror is seven (7) faces, using cases of A=9 mm, θin=50 degrees; A=10 mm, θin=50 degrees; and A=11 mm, θin=50 degrees.

Figure 16:
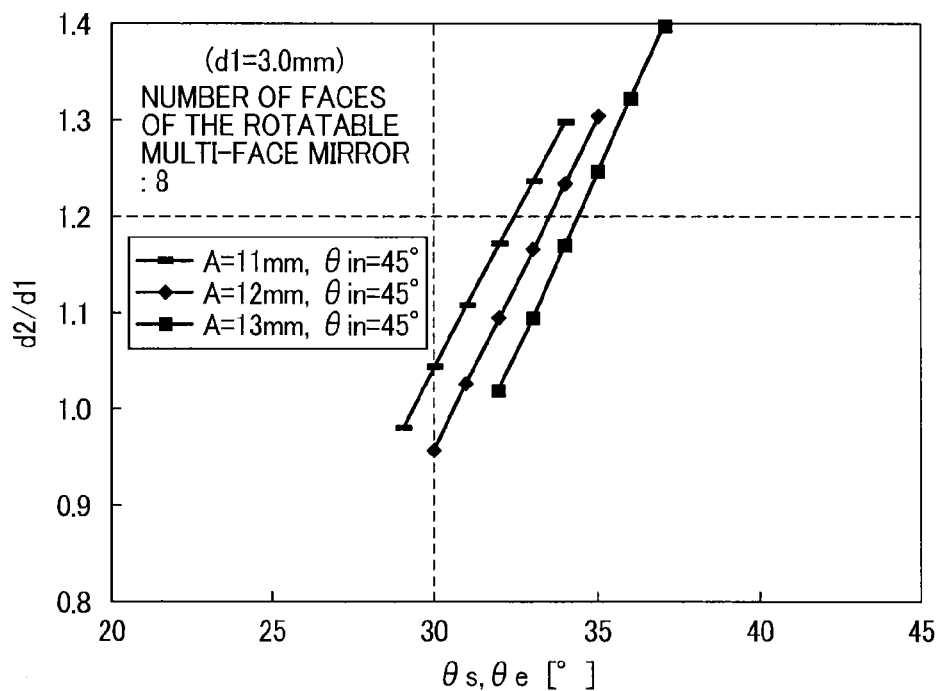
FIG. 16 shows a relationship of d2/d1 and the angle θs or θe when the number of faces of the rotatable multi-faceted mirror is eight and d1=3.0 mm.

FIG. 16 shows a relationship of d2/d1 and the angle θs or θe when the number of faces of the rotatable multi-faceted mirror is eight (8) faces, using cases of A=11 mm, θin=45 degrees; A=12 mm, θin=45 degrees; and A=13 mm, θin=45 degrees.

Figure 17:
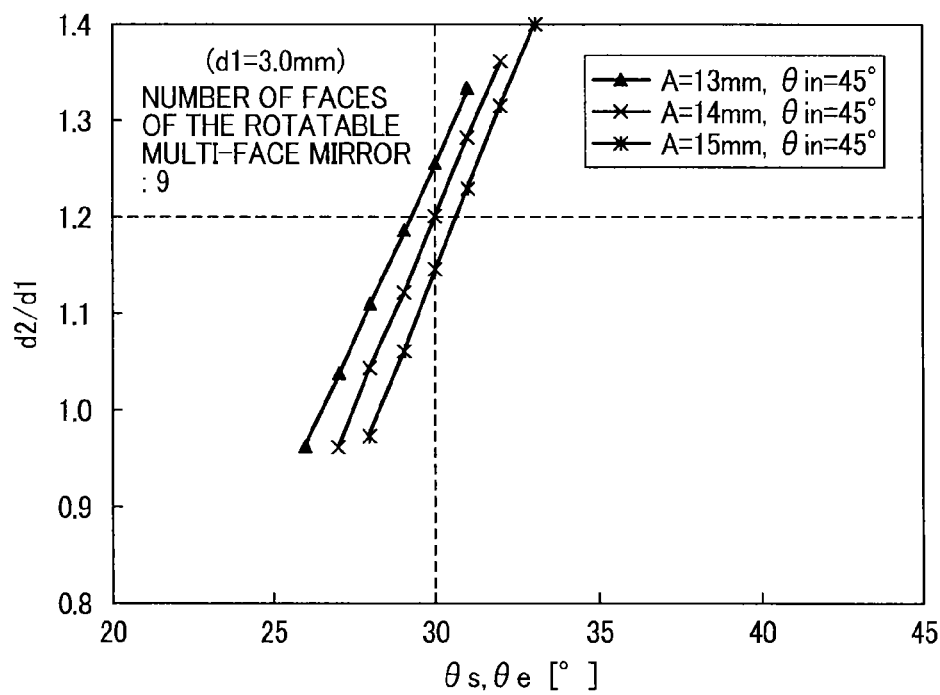
FIG. 17 shows a relationship of d2/d1 and the angle θs or θe when the number of faces of the rotatable multi-faceted mirror is nine and d1=3.0 mm.

FIG. 17 shows a relationship of d2/d1 and the angle θs or θe when the number of faces of the rotatable multi-faceted mirror is nine (9) faces, using cases of A=13 mm, θin=45 degrees; A=14 mm, θin=45 degrees; and A=15 mm, θin=45 degrees.

As indicated in FIGS. 14 to 17, when a range of d2/d1 is set from 1 to 1.2, and the angle θs or θe is set 30 degrees or more, for example, when d1=3.0 mm is used, the number of faces of the rotatable multi-faceted mirror is preferably eight (8) faces or less. If the number of faces of the rotatable multi-faceted mirror is nine (9) faces, the length A is required to be 15 mm or more, by which the size of the rotatable multi-faceted mirror increases, which is not preferable.

FIGS. 18 to 21 show relationships of d2/d1 and the angle θs or θe when d1=3.5 mm.

Figure 18:
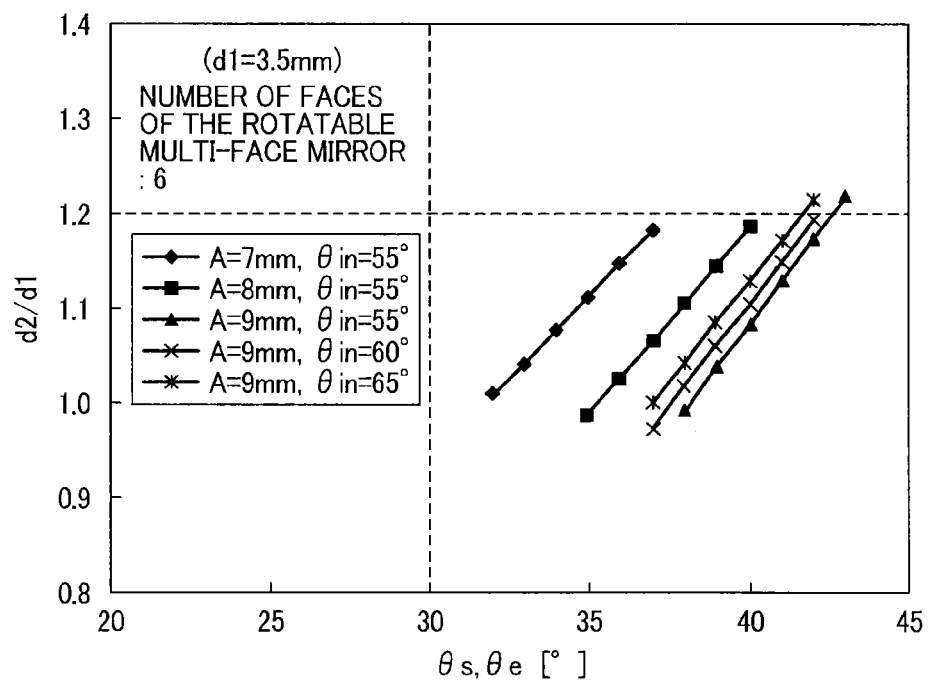
FIG. 18 shows a relationship of d2/d1 and the angle θs or θe when the number of faces of the rotatable multi-faceted mirror is six and d1=3.5 mm.

FIG. 18 shows a relationship of d2/d1 and the angle θs or θe when the number of faces of the rotatable multi-faceted mirror is six (6) faces, using cases of A=7 mm, θin=55 degrees; A=8 mm, θin=55 degrees; A=9 mm, θin=55 degrees; A=9 mm, θin=60 degrees; and A=9 mm, θin=65 degrees.

Figure 19:
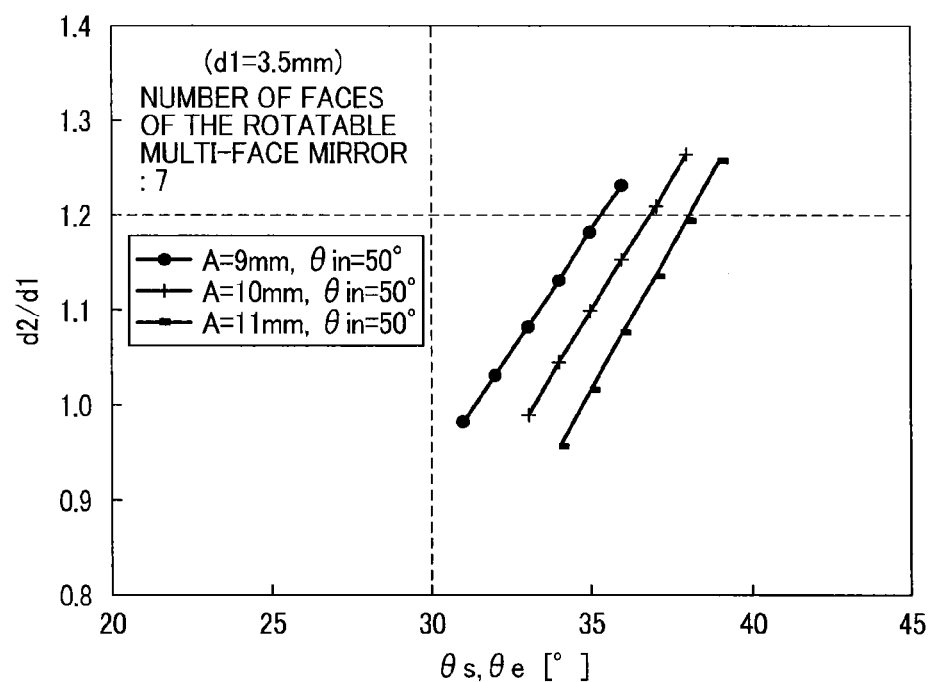
FIG. 19 shows a relationship of d2/d1 and the angle θs or θe when the number of faces of the rotatable multi-faceted mirror is seven and d1=3.5 mm.

FIG. 19 shows a relationship of d2/d1 and the angle θs or θe when the number of faces of the rotatable multi-faceted mirror is seven (7) faces, using cases of A=9 mm, θin=50 degrees; A=10 mm, θin=50 degrees; and A=11 mm, θin=50 degrees.

Figure 20:
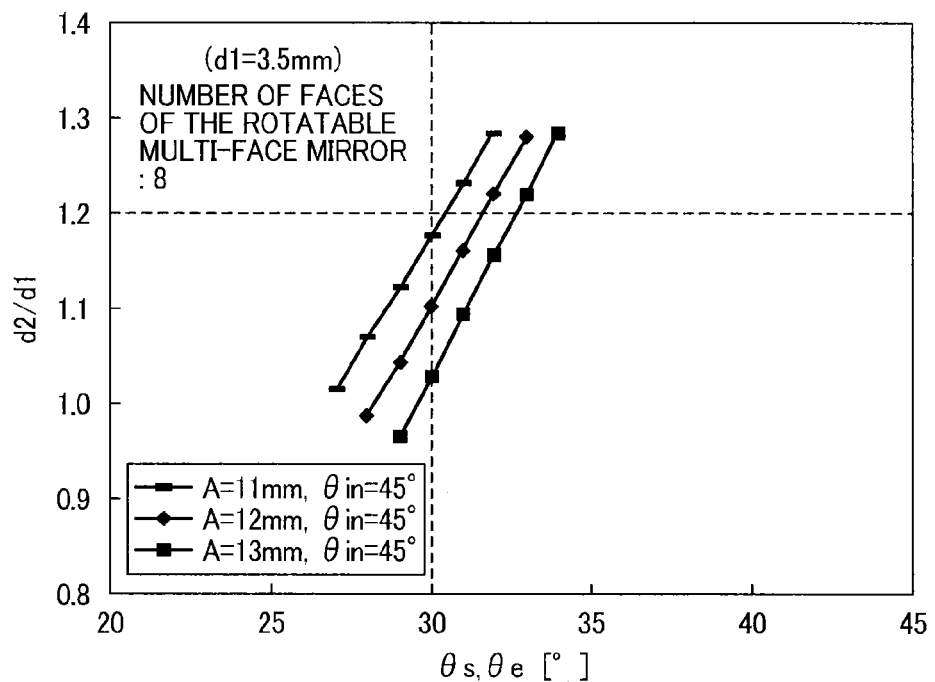
FIG. 20 shows a relationship of d2/d1 and the angle θs or θe when the number of faces of the rotatable multi-faceted mirror is eight and d1=3.5 mm.

FIG. 20 shows a relationship of d2/d1 and the angle θs or θe when the number of faces of the rotatable multi-faceted mirror is eight (8) faces, using cases of A=11 mm, θin=45 degrees; A=12 mm, θin=45 degrees; and A=13 mm, θin=45 degrees.

Figure 21:
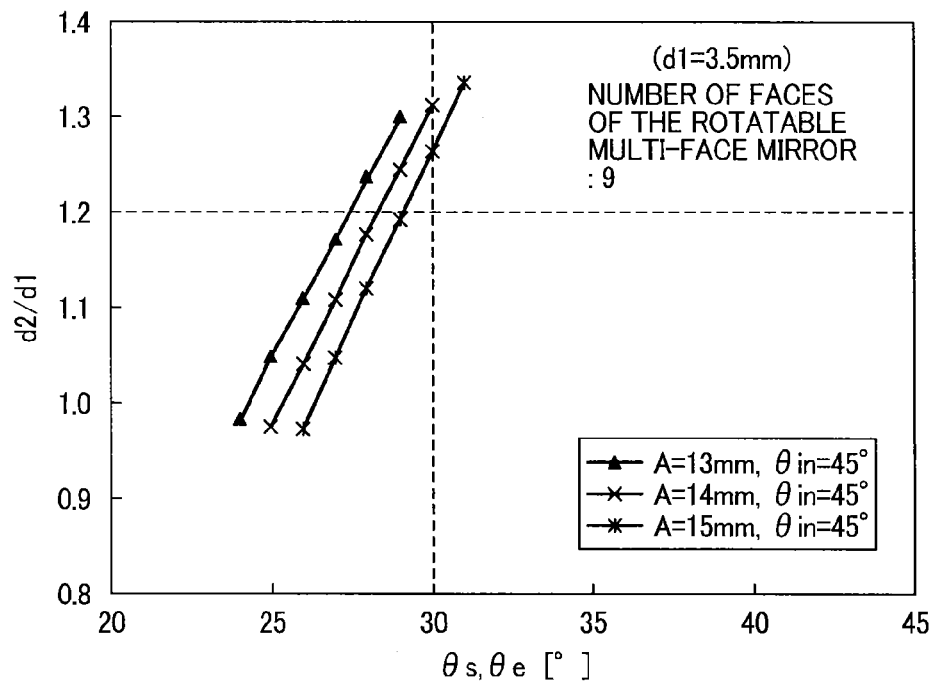
FIG. 21 shows a relationship of d2/d1 and the angle θs or θe when the number of faces of the rotatable multi-faceted mirror is nine and d1=3.5 mm.

FIG. 21 shows a relationship of d2/d1 and the angle θs or θe when the number of faces of the rotatable multi-faceted mirror is nine (9) faces, using cases of A=13 mm, θin=45 degrees; A=14 mm, θin=45 degrees; and A=15 mm, θin=45 degrees.

As indicated in FIGS. 18 to 21, when a range of d2/d1 is from 1 to 1.2, and the angle θs or θe is 30 degrees or more, for example, when d1=3.5 mm is used, the number of faces of the rotatable multi-faceted mirror is preferably eight (8) faces or less. When the number of faces of the rotatable multi-faceted mirror is eight (8) faces, the length A is 11 to 13 mm smaller than the length A of 17 to 18 mm of conventional rotatable multi-faceted mirrors. If the number of faces of the rotatable multi-faceted mirror is nine (9) faces, the length A is required to be 15 mm or more, by which the size of the rotatable multi-faceted mirror increases, which is not preferable.

FIGS. 22 to 25 show relationships of d2/d1 and the angle θs or θe when d1=4.0 mm.

Figure 22:
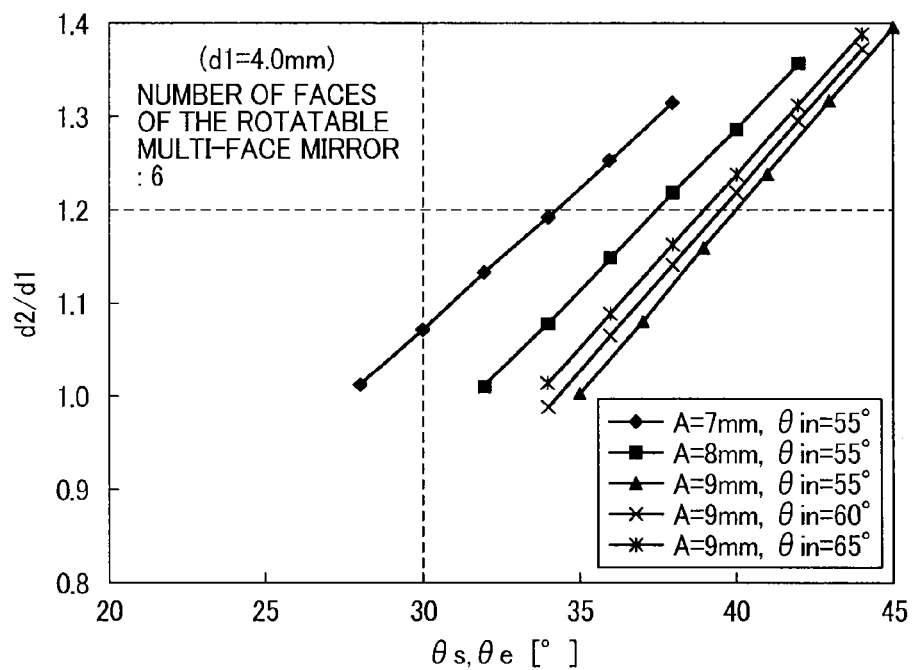
FIG. 22 shows a relationship of d2/d1 and the angle θs or θe when the number of faces of the rotatable multi-faceted mirror is six and d1=4.0 mm.

FIG. 22 shows a relationship of d2/d1 and the angle θs or θe when the number of faces of the rotatable multi-faceted mirror is six (6) faces, using cases of A=7 mm, θin=55 degrees; A=8 mm, θin=55 degrees; A=9 mm, θin=55 degrees; A=9 mm, θin=60 degrees; and A=9 mm, θin=65 degrees.

Figure 23:
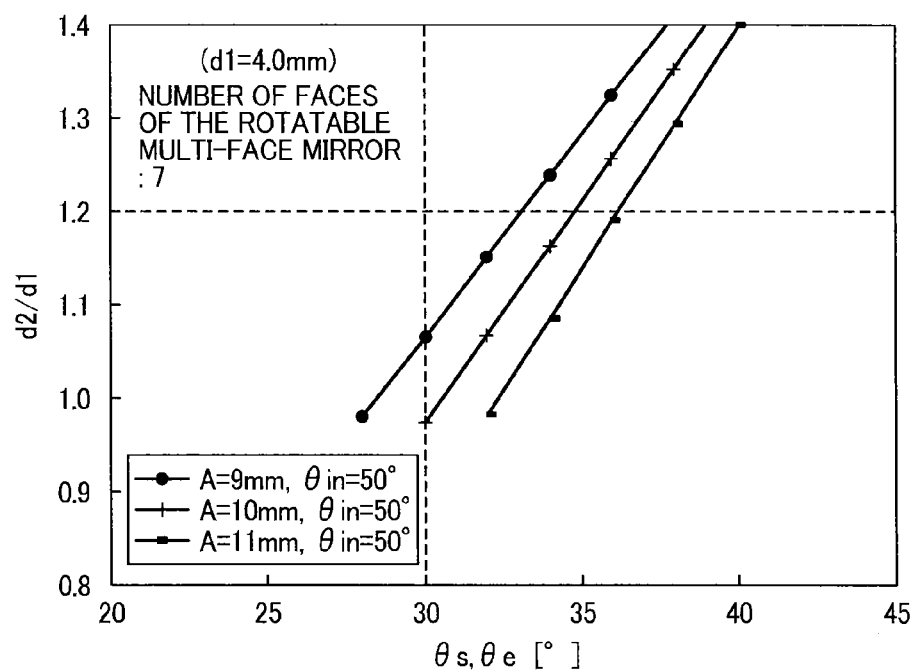
FIG. 23 shows a relationship of d2/d1 and the angle θs or θe when the number of faces of the rotatable multi-faceted mirror is seven and d1=4.0 mm.

FIG. 23 shows a relationship of d2/d1 and the angle θs or θe when the number of faces of the rotatable multi-faceted mirror is seven (7) faces, using cases of A=9 mm, θin=50 degrees; A=10 mm, θin=50 degrees; and A=11 mm, θin=50 degrees.

Figure 24:
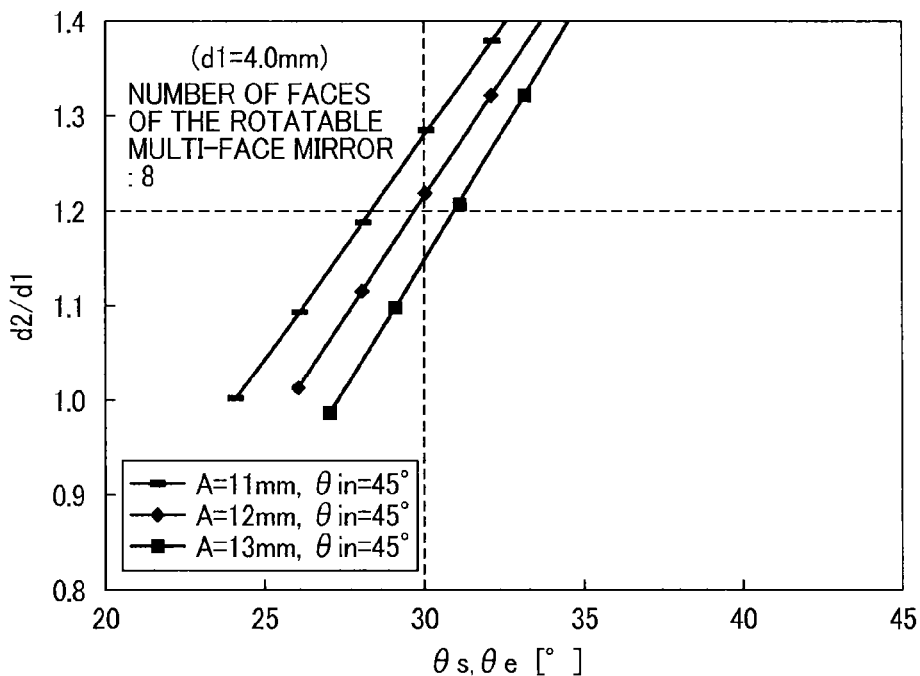
FIG. 24 shows a relationship of d2/d1 and the angle θs or θe when the number of faces of the rotatable multi-faceted mirror is eight and d1=4.0 mm.

FIG. 24 shows a relationship of d2/d1 and the angle θs or θe when the number of faces of the rotatable multi-faceted mirror is eight (8) faces, using cases of A=11 mm, θin=45 degrees; A=12 mm, θin=45 degrees; and A=13 mm, θin=45 degrees.

Figure 25:
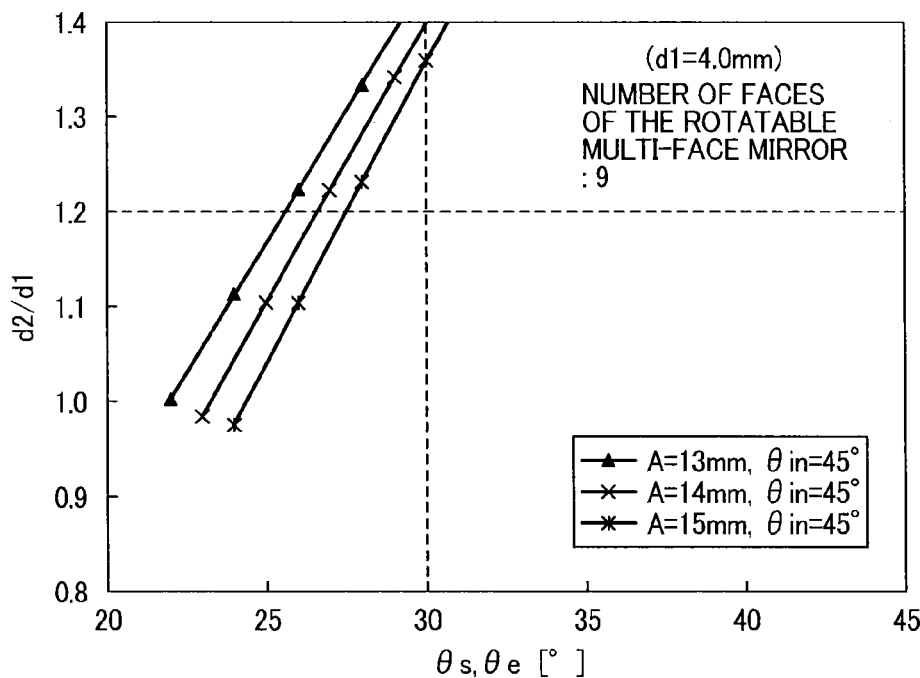
FIG. 25 shows a relationship of d2/d1 and the angle θs or θe when the number of faces of the rotatable multi-faceted mirror is nine and d1=4.0 mm.

FIG. 25 shows a relationship of d2/d1 and the angle θs or θe when the number of faces of the rotatable multi-faceted mirror is nine (9) faces, using cases of A=13 mm, θin=45 degrees; A=14 mm, θin=45 degrees; and A=15 mm, θin=45 degrees.

As indicated in FIGS. 22 to 25, when a range of d2/d1 is set from 1 to 1.2, and the angle θs or θe is 30 degrees or more, for example, when d1=4.0 mm is used, the number of faces of the rotatable multi-faceted mirror is preferably eight (8) faces or less. When the number of faces of the rotatable multi-faceted mirror is seven (7) faces, the length A is 9 to 11 mm, by which the rotatable multi-faceted mirror is relatively small. When the number of faces of the rotatable multi-faceted mirror is eight (8) faces, the length A is 13 to 14 mm, by which the rotatable multi-faceted mirror can be smaller than conventional rotatable multi-faceted mirrors having the length A of 17 to 18 mm. If the number of faces of the rotatable multi-faceted mirror is nine (9) faces, the length A is required to be 15 mm or more, by which the size of the rotatable multi-faceted mirror increases, which is not preferable.

When manufacturing the optical scanning unit 2010, the optical scanning unit 2010 can be provided with a beam diameter detector disposed near a position optically equal to the face of the photoconductive drum such as both ends of the scanning area to detect a beam diameter of incident light flux. At both ends of the scanning area, the incident position of incident light flux to the rotatable multi-faceted mirror is adjusted to set the equal diameter for beam spots of the incident light flux at both ends of the scanning area.

Further, when manufacturing the optical scanning unit 2010, the optical scanning unit 2010 can be provided with a light intensity detector such as light power meter disposed near a position optically equal to the surface of the photoconductive drum such as both ends of the scanning area to detect light intensity of incident light flux. At both ends of the scanning area, the incident position of incident light flux to the rotatable multi-faceted mirror is adjusted to set the equal light intensity for the incident light flux at both ends of the scanning area.

As described above, the optical scanning unit 2010 includes, for example, the light sources 2200A, 2200B, the pre-deflector optical system, the optical deflector 2104, and the scanning optical system.

The pre-deflector optical system includes, for example, the four aperture plates 2202a, 2202b, 2202c, 2202d having the corresponding aperture to shape the light flux emitted from the four light sources. Each of the aperture plates has the aperture having a given shape. Specifically, the opening width of the aperture in the sub-scanning corresponding direction at the two end portions in the main scanning corresponding direction is small compared to the center portion in the main scanning corresponding direction.

Further, it is designed, when the light flux reflected by the rotatable multi-faceted mirror is directed to the center portion of the scanning area on the corresponding photoconductive drum, the entire light flux entering the rotatable multi-faceted mirror is reflected on one reflection face, and it is designed, when the light flux reflected by the rotatable multi-faceted mirror is directed to the end portion of the scanning area on the corresponding photoconductive drum, a part of the light flux entering the rotatable multi-faceted mirror is reflected on one reflection face while other remaining part of the light flux is reflected on other reflection face With this configuration, the rotatable multi-faceted mirror can be compact in size, and the scan angle can be set greater, and thereby the scanned surface can be optically scanned with a high speed and high precision without increasing of size and cost.

Therefore, the image forming apparatus 2000 including the optical scanning unit 2010 can form high quality image with a high speed without the increase of size and cost.

In the above described example embodiment, cases having din=3.8 mm are disclosed but not limited hereto. For example, FIGS. 26 to 28 show cases using din=3.5 mm.

Figure 26:
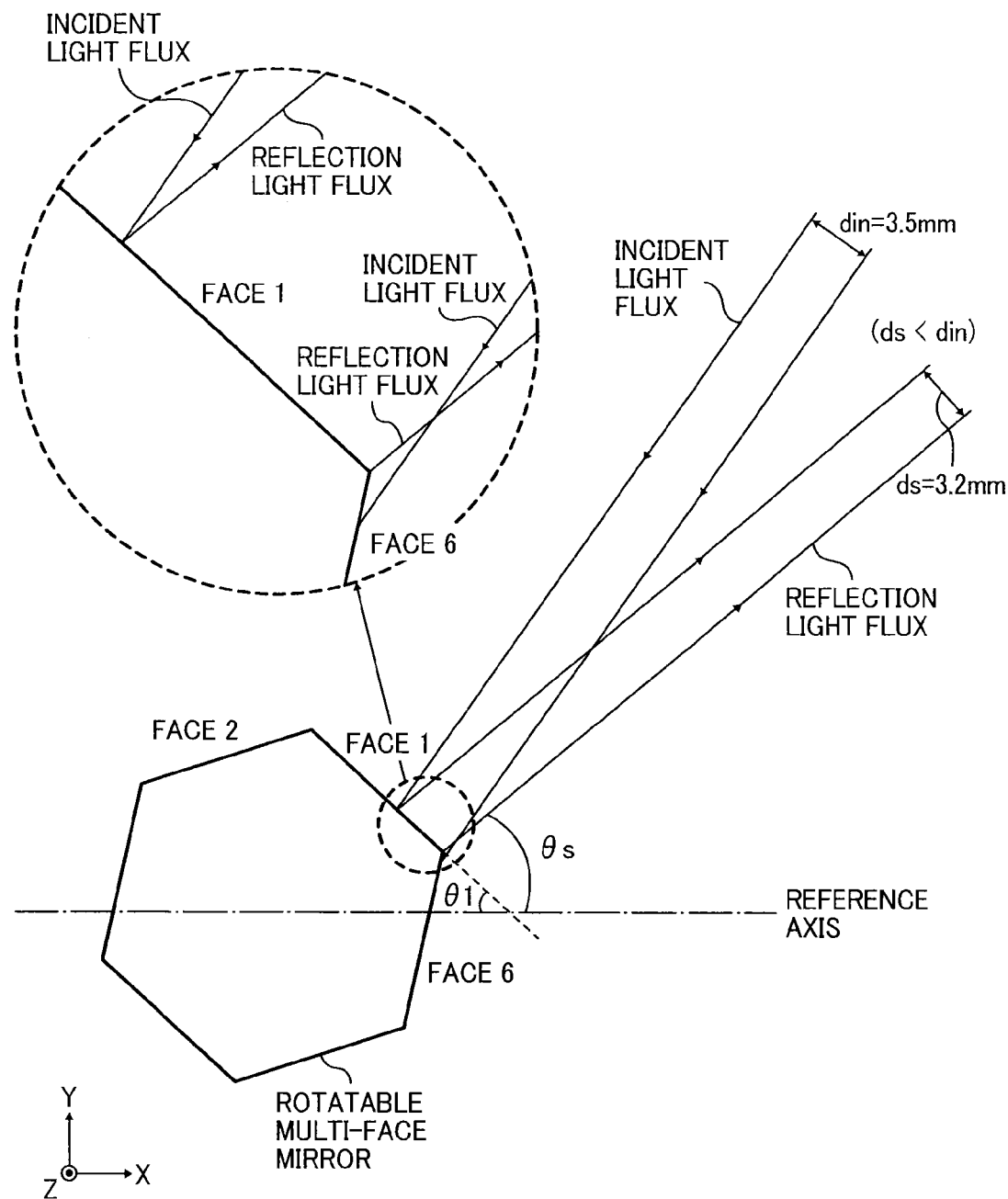
FIGS. 26, 27 and 28 show schematic configurations of a first variant example.

FIG. 26 shows the incident light flux and the reflection light flux with respect to the rotatable multi-faceted mirror when the light flux deflected at the optical deflector 2104 is directed to the scanning start position for the scanning area of the photoconductive drum, in which ds=3.2 mm and a relationship of "ds<din" is used.

Further, the progression direction of light flux reflected at the face 1 of the rotatable multi-faceted mirror and the reference axis form an angle θs of, for example, 40.0 degrees. Further, the inclined angle θ1 of the face 1 with respect to the reference axis is, for example, 42.5 degrees.

Figure 27:
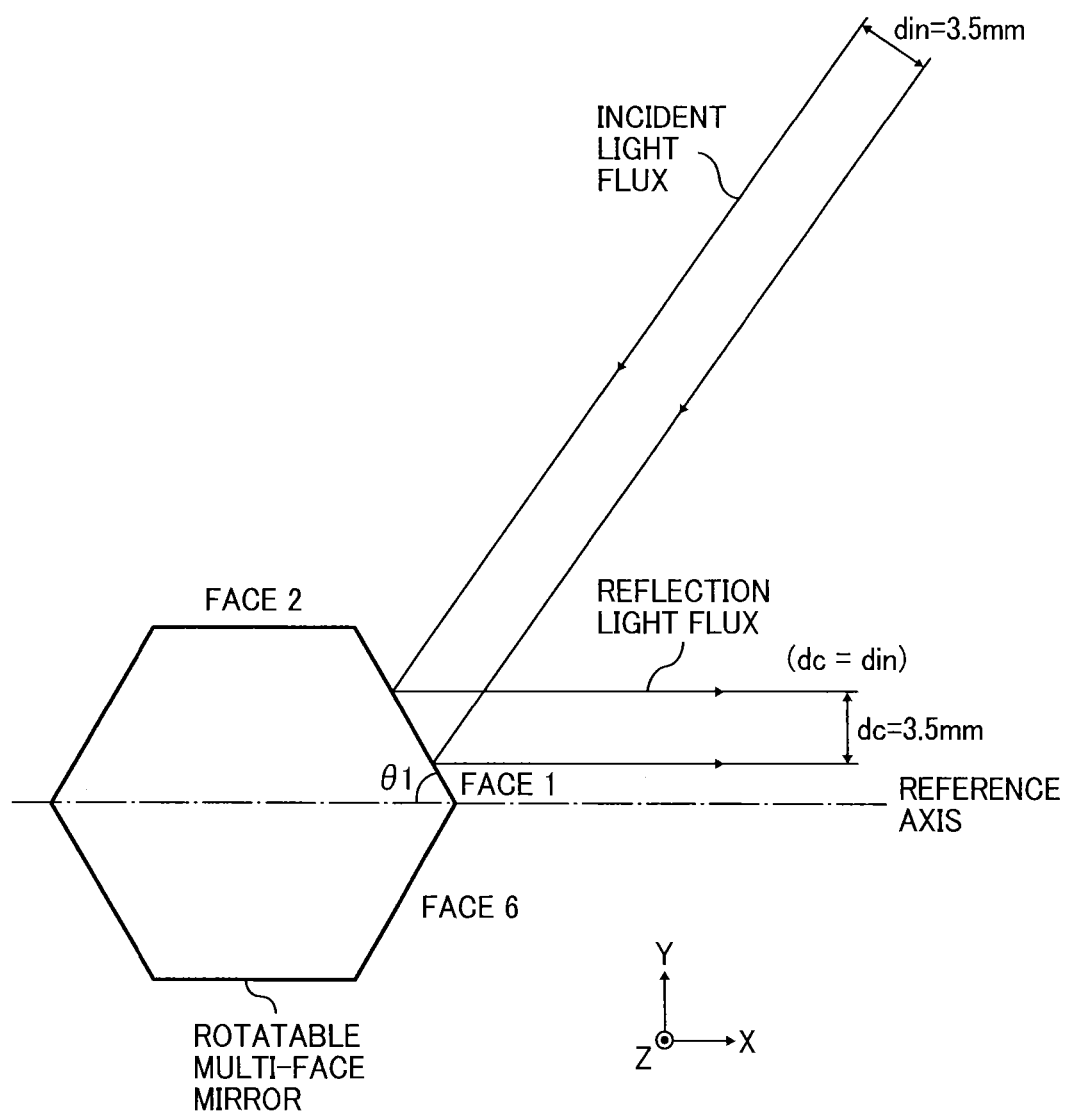
Figure 28:
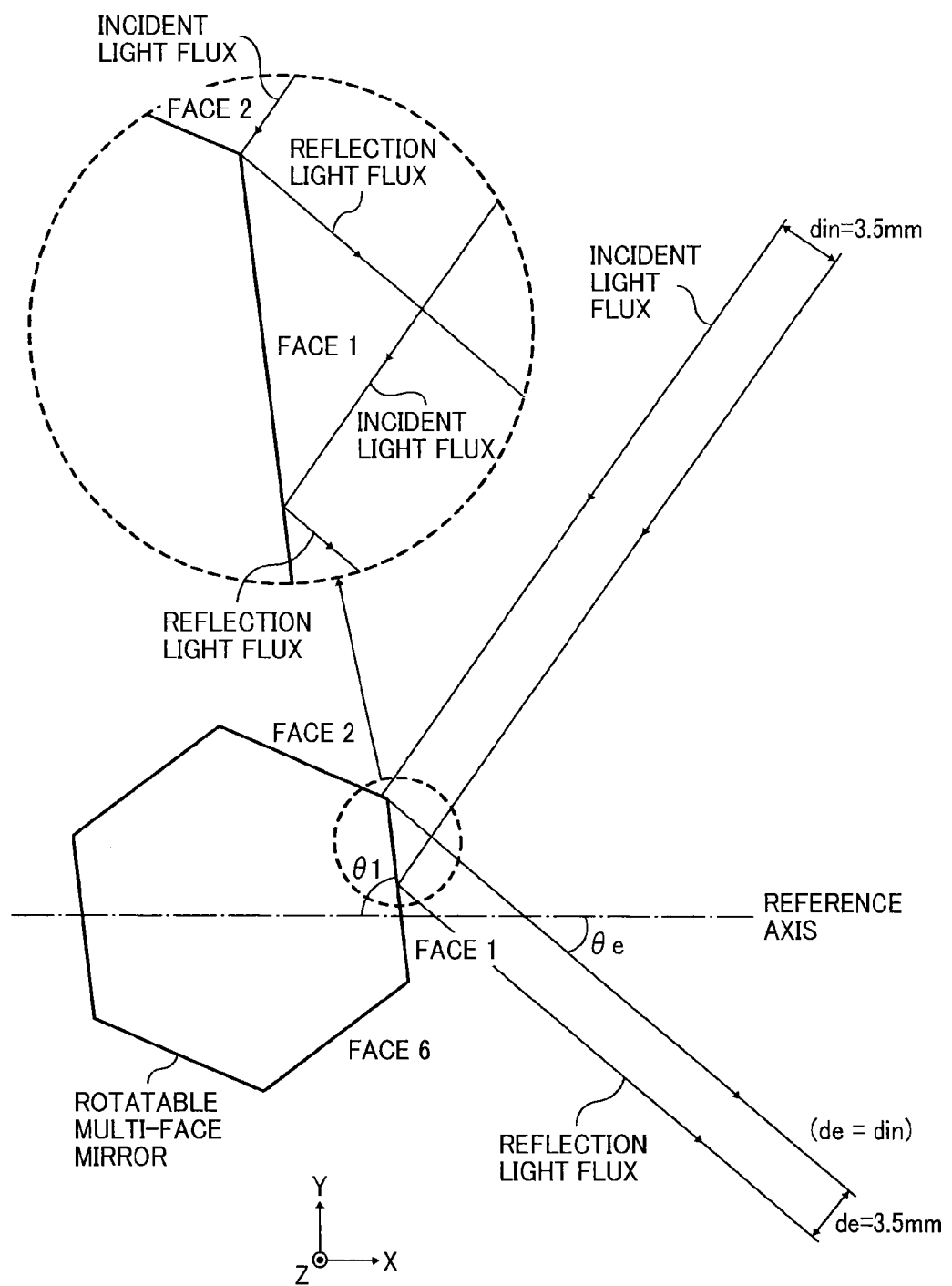

FIG. 27 shows the incident light flux and the reflection light flux with respect to the rotatable multi-faceted mirror when the light flux deflected at the optical deflector 2104 is directed to the center position of the scanning area of the photoconductive drum, in which dc=3.5 mm and a relationship of "dc=din" is used. Further, the inclined angle θ1 of the face 1 with respect to the reference axis is, for example, 62.5 degrees.

FIG. 28 shows the incident light flux and the reflection light flux with respect to the rotatable multi-faceted mirror when the light flux deflected at the optical deflector 2104 is directed to the scanning end position for the scanning area of the photoconductive drum, in which de=3.5 mm and a relationship of "de=din" is used.

Further, the progression direction light flux reflected at the face 1 of the rotatable multi-faceted mirror and the reference axis form an angle θe of, for example, 40.0 degrees. Further, the inclined angle θ1 of the face 1 with respect to the reference axis is, for example, 82.5 degrees.

In this case, at the timing directed to the scanning start position for the scanning area of the photoconductive drum, the incident light flux is cut at the optical deflector 2104, but at the timing directed to the scanning end position for the scanning area of the photoconductive drum, the incident light flux is not cut at the optical deflector 2104. Further, in this case, the scan angle is, for example, 80.0 degrees.

Further, in the above described example embodiment, the diameter of the inscribed circle of the rotatable multi-faceted mirror is set 18 mm but not limited such value. Depending on a required value for d2/d1 and the angle θs or θe, the diameter of the inscribed circle of the rotatable multi-faceted mirror can be variably set.

Further, in the above described example embodiment, the rotatable multi-faceted mirror has six mirror faces but not limited hereto. For example, the rotatable multi-faceted mirror can have seven mirror faces as shown in FIG. 29.

Figure 29:
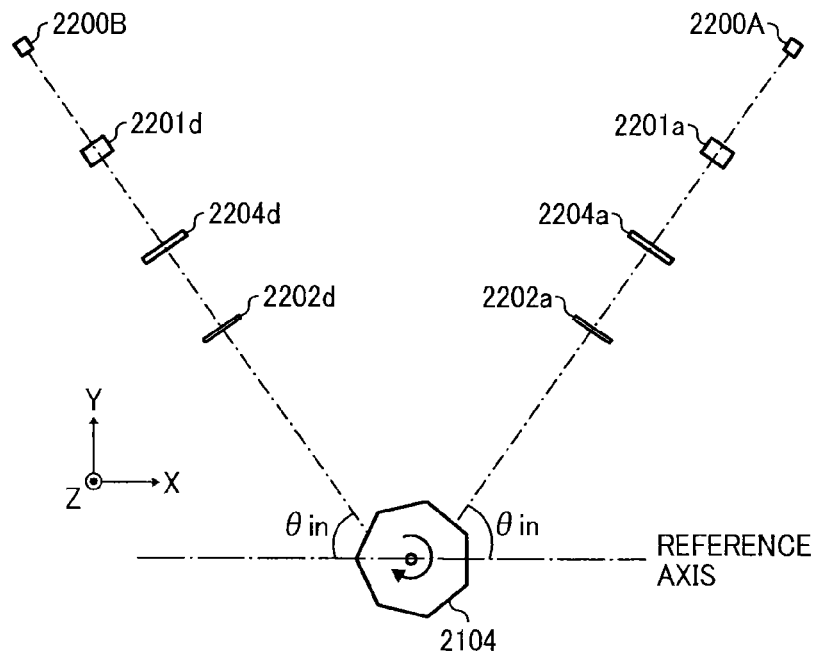
FIGS. 29, 30, 31, 32 and 33 show schematic configurations of a second variant example.

When FIG. 29 is viewed from the Z-axis direction, it is designed that the progression direction of the light flux emitted from the light source and entering the deflective reflection face and the reference axis form an angle θin such as 60.0 degrees.

Figure 30:
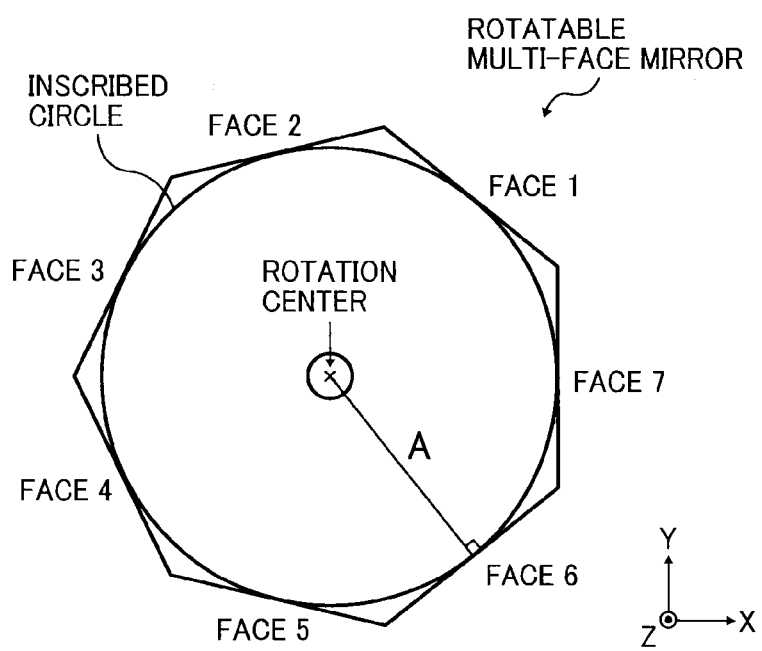

A diameter of an inscribed circle of the rotatable multi-faceted mirror (FIG. 30) may be, for example, 26 mm. Further, if the seven deflective reflection faces are required to be distinguished, the seven deflective reflection faces may referred to the face 1, the face 2, the face 3, the face 4, the face 5, the face 6, and the face 7 in the counter clockwise direction.

Figure 31:
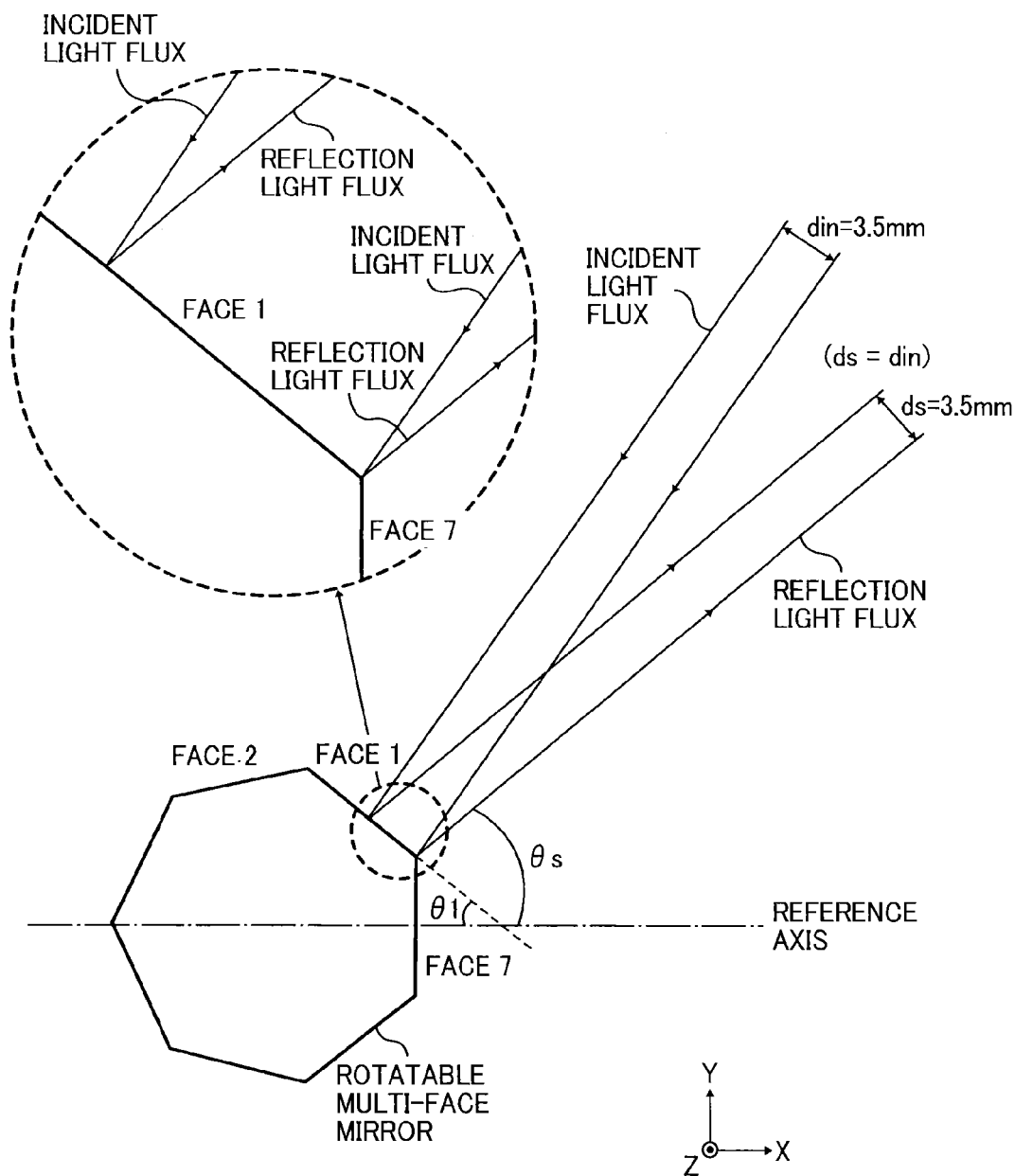
Figure 32:
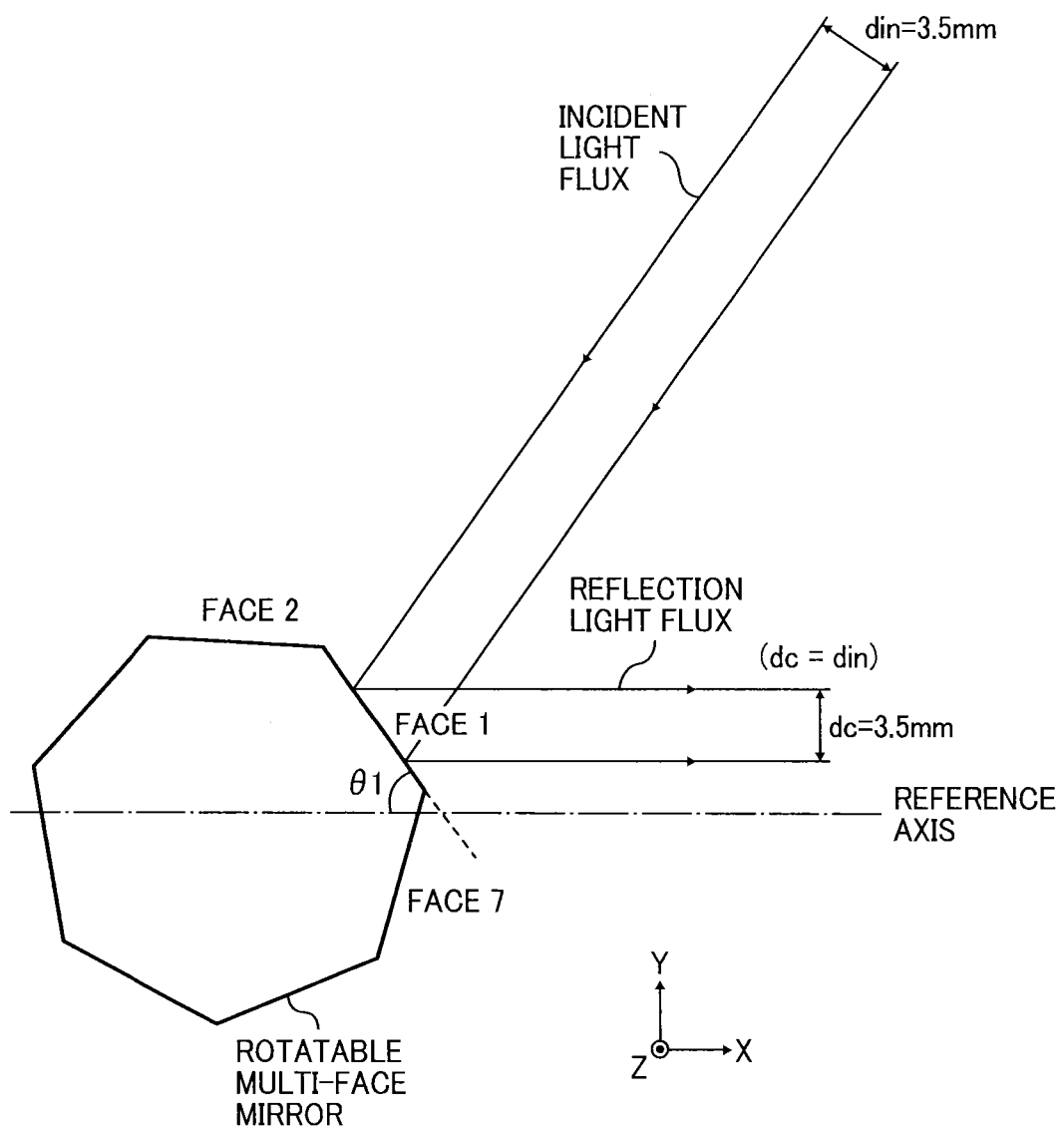
Figure 33:
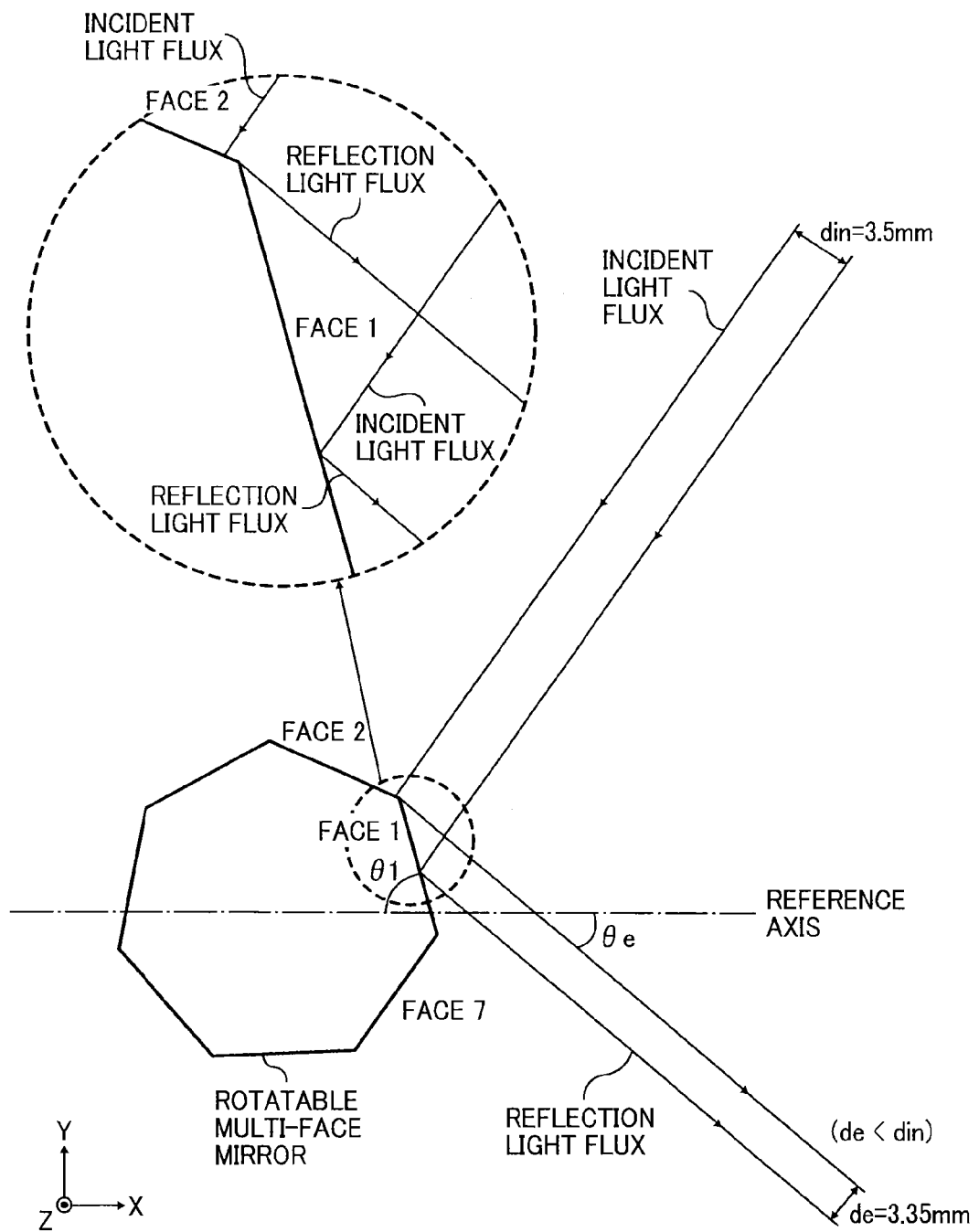

Further, FIGS. 31 to 33 show example configurations when din=3.5 mm. FIG. 31 shows the incident light flux and the reflection light flux with respect to the rotatable multi-faceted mirror when the light flux deflected at the optical deflector 2104 is directed to the scanning start position for the scanning area of the photoconductive drum, in which ds=3.5 mm and a relationship of "ds=din" is used.

Further, the progression direction of light flux reflected at the face 1 of the rotatable multi-faceted mirror and the reference axis form an angle θs of, for example, 36.0 degrees. Further, the inclined angle θ1 of the face 1 with respect to the reference axis is, for example, 42.0 degrees.

FIG. 32 shows the incident light flux and the reflection light flux with respect to the rotatable multi-faceted mirror when the light flux deflected at the optical deflector 2104 is directed to the center position of the scanning area of the photoconductive drum, in which dc=3.5 mm and a relationship of "dc=din" is used. Further, the inclined angle θ1 of the face 1 with respect to the reference axis is, for example, 60.0 degrees.

FIG. 33 shows the incident light flux and the reflection light flux with respect to the rotatable multi-faceted mirror when the light flux deflected at the optical deflector 2104 is directed to the scanning end position for the scanning area of the photoconductive drum, in which de=3.35 mm and a relationship of "de<din" is used.

Further, the progression direction of light flux reflected at the face 1 of the rotatable multi-faceted mirror and the reference axis form an angle θe of, for example, 36.0 degrees. Further, the inclined angle θ1 of the face 1 with respect to the reference axis is, for example, 78.0 degrees.

In this case, at the timing directed to the scanning end position for the scanning area of the photoconductive drum, the incident light flux is cut at the optical deflector 2104, but at the timing directed to the scanning start position for the scanning area of the photoconductive drum, the incident light flux is not cut at the optical deflector 2104. Further, in this case, the scan angle is, for example, 72.0 degrees.

When the incident light flux is cut at the optical deflector 2104 at the timing directed to the scanning start position for the scanning area of the photoconductive drum or at the timing directed to the scanning end position for the scanning area of the photoconductive drum, the aperture of the aperture plate can be formed into a shape shown in FIGS. 34A to 34D, in which the length (opening width) of one end of the aperture in the sub-scanning corresponding direction is smaller compared to the center portion of the aperture in the sub-scanning corresponding direction, wherein the aperture extends in the main scanning corresponding direction. The smaller length (opening width) of one end of the aperture is corresponded to the side that the incident light flux is cut in the main scanning corresponding direction.

A position in the main scanning area in the main scanning direction on the scanned surface is referred to as an image height. Hereinafter, the center position in the main scanning area with respect to the main scanning direction is referred to as a center image height, and each of the both end portions in the main scanning area with respect to the main scanning direction is referred to as a peripheral image height. Typically, the image height is expressed by coordinates setting the coordinates of the center image height as zero. For example, when an entire length of the main scanning area with respect to the main scanning direction is 300 mm, the center image height is set zero (0) mm, the peripheral image height at one side is set +150 mm, and the peripheral image height at other side is set −150 mm Further, an area in the main scanning area that an image is formed is referred to as an image area. Further, hereinafter, for the simplicity of expression, as for the light flux deflected by the optical deflector, when a part of the incidence light flux is cut at the optical deflector, such light flux is referred to as a light flux cut at the optical deflector.

In the above described example embodiment, the light flux directed to the end portion of the main scanning area on the photoconductor drum is the light flux cut at the optical deflector 2104. Therefore, for example, if a synchronization detection sensor 2115 is disposed at a position shown in FIG. 35, the light flux deflected by the optical deflector 2104 enters the synchronization detection sensor 2115 before the writing starts, and the light flux cut at the optical deflector 2104 can be received by the synchronization detection sensor 2115. Hereinafter, the light flux received by the synchronization detection sensor 2115 is referred to as a synchronization detection light flux. In this case, an increase of beam spot diameter and a decrease of light intensity may occur to the synchronization detection light flux.

When the light flux is projected onto a plane perpendicular to a rotation axis of the rotatable multi-faceted mirror, an angle defined by the light flux directed to the synchronization detection sensor 2115 and the light flux entering or striking the optical deflector 2104 is smaller than an angle defined by the light flux directed to the main scanning area and the light flux entering or striking the optical deflector 2104. Further, hereinafter, a position where the synchronization detection sensor 2115 is disposed is referred to as a synchronization detection position.

An effect of the increase of beam spot diameter to a finally-formed image is small because the changed amount of beam spot diameter is small such as a several μm or so. In contrast, the decrease of light intensity may cause a synchronization detection error due to lack of enough light intensity.

Further, the light flux directed to the end portion of the main scanning area on the photoconductor drum and used within the image area may be the light flux cut at the optical deflector 2104. In this case, the density unevenness may occur at the end portion of image, thereby degrading the image quality.

Typically, the fluctuation of light intensity can be corrected by changing the output of the light source with respect to the main scanning direction. For example, theoretically, the emission light intensity of the light source is increased for the amount equal to the decrease of light intensity, by which the light intensity on the surface of the photoconductor drum can become even or uniform. Further, the decrease of light intensity of the synchronization detection light flux can be compensated by increasing the sensitivity of the synchronization detection sensor 2115.

The fluctuation of light intensity on the surface of the photoconductor drum with respect to the main scanning direction does not change abruptly such as unpredictable change but may change gradually such as a mild curve line. Further, the fluctuation of light intensity caused by the cutting at the optical deflector can be the decrease of light intensity expressed by a substantially linear function.

The light intensity correction may be conducted in view of adjustment time. Specifically, the light intensity may not be corrected based on the measurement result of the light intensity using a small adjustment pitch such as 1 mm to 5 mm with respect to the main scanning direction, but the light intensity may be corrected based on the measurement result of the light intensity using an adjustment pitch of 5 mm (minimum pitch) or more, or rough adjustment pitch such as 30 mm to 50 mm with respect to the main scanning direction, by which an optical scanning apparatus that can reduce an adjustment time can be provided with a lower cost.

Figure 36:
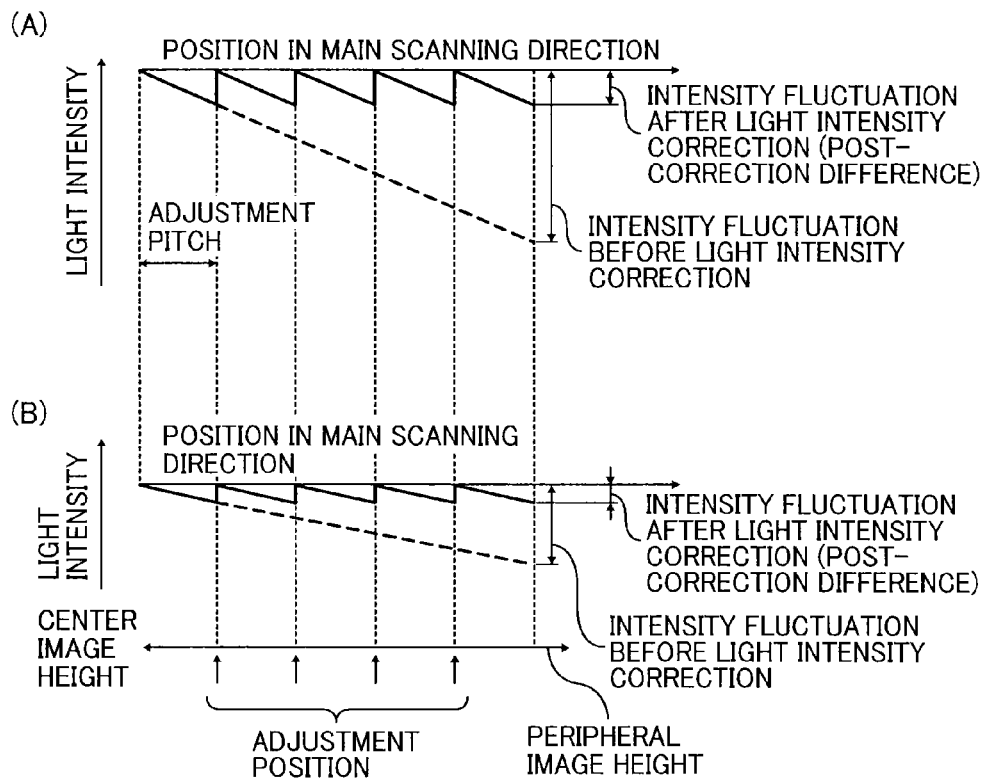
FIGS. 36(A) and 36(B) show examples of fluctuation of light intensity before light intensity correction and after light intensity correction indicating post-correction difference.

FIGS. 36(A) and 36(B) show examples of the fluctuation of light intensity before the light intensity correction and the fluctuation of light intensity after the light intensity correction (post-correction difference). The vertical axis of FIGS. 36(A) and 36(B) represents the light intensity on the surface of the photoconductor drum, and the horizontal axis represents positions (i.e., image height) with respect to the main scanning direction. FIG. 36(A) shows a case that the fluctuation of light intensity before the light intensity correction is great, and FIG. 36(B) shows a case that that the fluctuation of light intensity before the light intensity correction is small. As indicated by FIGS. 36(A) and 36(B), if the fluctuation of light intensity before the light intensity correction is great and a rough adjustment pitch is applied, the post-correction difference may become great.

The post-correction difference shown in FIGS. 36(A) and 36(B) is the light intensity difference between two adjacent areas adjacent with each other via one adjustment position. If the difference of light intensity at the two adjacent areas is about 2% to 3%, the difference appears as a density change such as a thick-thin-portion-included image, and thereby the image quality deteriorates, which is confirmed by experiments. Therefore, to set the adjustment pitch as a rough pitch, it is preferable that the fluctuation of light intensity is small as much as possible. The post-correction difference can be reduced by making the adjustment pitch smaller, but the smaller adjustment pitch increases the adjustment time and cost as a whole.

For example, if the post-correction difference of FIG. 36(B) is used as the limit that no thick-thin-portion occurs on the image, the post-correction difference of FIG. 36(A) causes density change and thereby unnecessary thick-thin-portion-included image occurs.

An output range of the light source is not infinite but has a given specific value such as 1 mW to 10 mW. Because the output range of the light source is used to adjust the fluctuation of transmittance and reflectance of optical parts disposed in the optical scanning apparatus and to adjust conditions of photoconductor drum which may be changed due to aging, it is preferable that the decrease of light intensity caused by the cutting at the optical deflector is small as much as possible.

Therefore, in the above described example embodiment, the light source may be pivoted or about an exit direction of the light flux (i.e., about the axis of the light source) so that the light flux that enters or strikes the optical deflector becomes a light flux having P-polarized light component stronger than the S-polarized light component with respect to the deflective reflection face of the optical deflector.

Typically, the light source includes a single laser diode (LD) having one light emitter, and the light source is disposed with a given arrangement so that the light flux exiting from the light source becomes the S-polarized light component with respect to the deflective reflection face of the optical deflector. Further, the angle of divergence is wide in the main scanning corresponding direction and narrow in the sub-scanning corresponding direction. In this case, the light intensity of the light flux, reflected at the deflective reflection face of the optical deflector and irradiated onto the photoconductor drum via a scan lens and a reflection mirror, becomes smaller at the peripheral image height compared to the center image height with respect to the main scanning direction.

In contrast, if the single LD is pivoted about the exit direction of the light flux (i.e., axis) so that the light flux having P-polarized light component stronger than S-polarized light component with respect to the deflective reflection face of the optical deflector enters or strikes the optical deflector, the light intensity of the light flux irradiated to the photoconductor drum becomes greater at the peripheral image height compared to the center image height with respect to the main scanning direction. In this case, even if the light intensity at the peripheral image height decreases due the cutting at the optical deflector, the decrease of the light intensity at the peripheral image height can be reduced.

Figure 37:
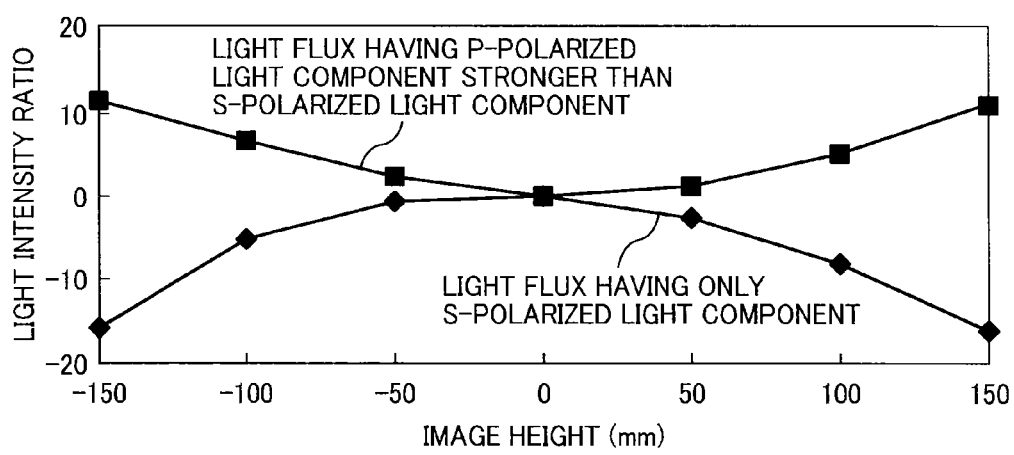
FIG. 37 shows light intensity ratio at each image height against image height of 0 mm when light flux having only S-polarized light component enters a deflective reflection face of an optical deflector, and when light flux having P-polarized light component stronger than S-polarized light component enters a deflective reflection face of an optical deflector.
Figure 38:
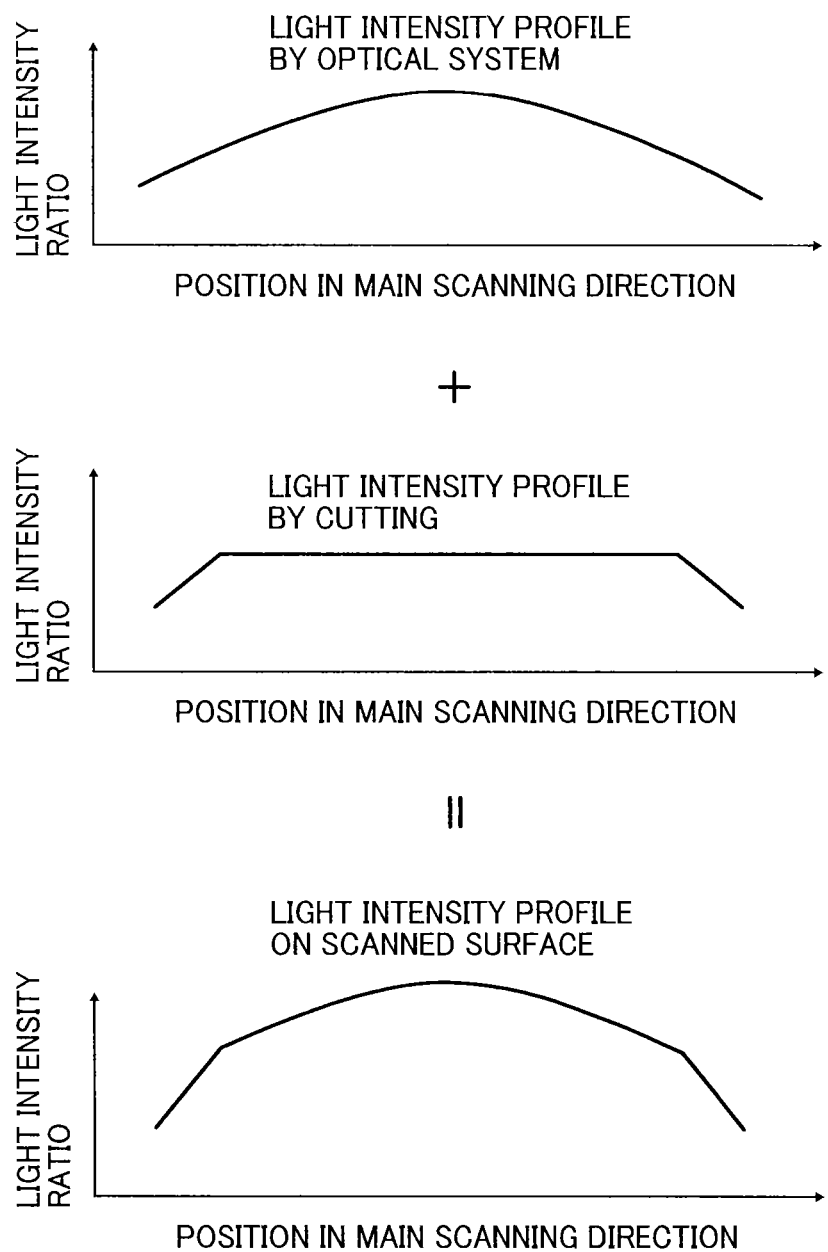
FIG. 38 shows an example of the light intensity profile when light flux having only S-polarized light component enters a deflective reflection face of an optical deflector.

A description is given with reference to FIGS. 37, 38 and 39. FIG. 37 shows the light intensity ratio at each image height against the image height of 0 mm when the light flux having only S-polarized light component enters the deflective reflection face of the optical deflector, and when the light flux having P-polarized light component stronger than S-polarized light component enters the deflective reflection face of the optical deflector. When the light flux having only S-polarized light component enters the deflective reflection face of the optical deflector, the light intensity is greater at the center image height, and when the light flux having P-polarized light component stronger than S-polarized light component enters the deflective reflection face of the optical deflector, the light intensity is greater at the peripheral image height.

Because the decrease of light intensity due to the cutting at the optical deflector is the same for both light fluxes, as schematically shown in FIGS. 38 and 39, when the light flux irradiates the scanned face of the photoconductor drum, the decrease of light intensity becomes smaller when the light flux having P-polarized light component stronger than S-polarized light component enters the deflective reflection face of the optical deflector.

Figure 40:
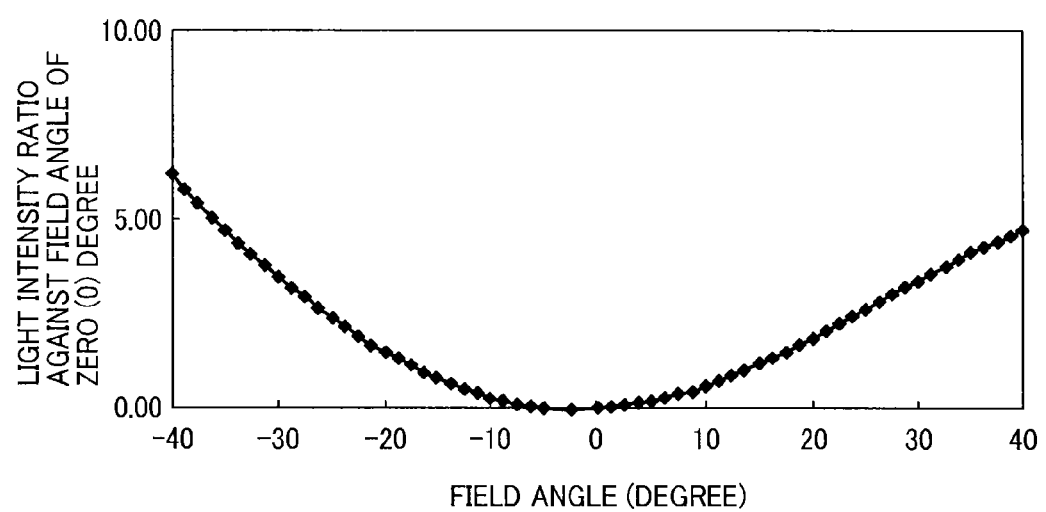
FIG. 40 shows an example of the light intensity profile when setting an intensity ratio of S-polarized light component and P-polarized light component of the light flux exiting from the light source and entering the optical deflector as 27:73.

FIG. 40 shows an example of the light intensity profile when a scanning optical system including one single scan lens having an angle of θs or θe of about 40 degrees, a reflection mirror at the optical deflector side having a deflection angle of about 36 degrees, and a mirror at the scanned surface side having a deflection angle of about 104 degrees is used while setting the intensity ratio of S-polarized light component and P-polarized light component of the light flux exiting from the light source and entering the optical deflector as 27:73.

With this configuration, the post-correction difference can be reduced without setting a smaller adjustment pitch and without increasing the cost.

Figure 35:
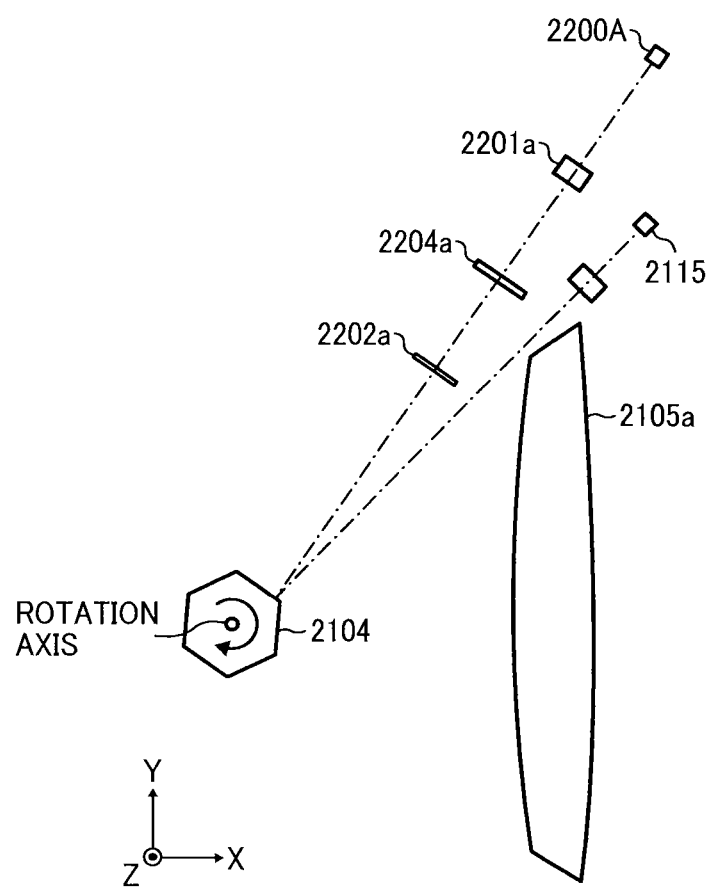
FIG. 35 shows a schematic arrangement of a synchronization detection sensor.

If the synchronization detection sensor 2115 is disposed at the position shown in FIG. 35, to which the light flux deflected by the optical deflector and before starting the writing enters. Further, if the light source is disposed in a given arrangement so that the light flux having only S-polarized light component enters the deflective reflection face of the optical deflector, the light intensity decreases at the peripheral image height. In this case, the light intensity received at the synchronization detection sensor 2115 may be decreased to about 50% of the light intensity at the center image height, wherein the light intensity decrease may be influenced by an optical configuration between the optical deflector 2104 and the synchronization detection sensor 2115 such as an arrangement of a synchronization lens and a reflection mirror.

If the decrease of light intensity due to the cutting at the optical deflector 2104 further occurs under this condition, the light intensity correction may not be conducted just by increasing the sensitivity of the synchronization detection sensor 2115, but the emission light intensity of the light source may need to be increased. However, because the output range of the light source is not infinite but has a specific value, increasing the output range of the emission light intensity may not be preferable.

In this case, by pivoting the light source, the light flux having P-polarized light component stronger than S-polarized light component can enter the deflective reflection face of the optical deflector 2104, by which the light intensity at the peripheral image height can be increased, and thereby the light intensity at the peripheral image height can be enhanced.

Further, in the above described example embodiment, the cutting amount of the light flux cut at the optical deflector and directed to one end portion of the main scanning area and the cutting amount of the light flux cut at the optical deflector and directed to other end portion of the main scanning area may be different values.

When the polarized-light direction of the light flux entering the optical deflector is angled from the S-polarized light component for the deflective reflection face of the optical deflector, depending on the deflection angle and coating condition of a reflection mirror that guides the light to the photoconductor drum, the reflectance near one end portion of the reflection mirror in the main scanning corresponding direction and the reflectance near other end portion of the reflection mirror in the main scanning corresponding direction become different, and thereby the light intensity on the face of the photoconductor drum also becomes different at the one end portion and the other end portion of the main scanning area, in which the deflection angle of the reflection mirror is determined based on a layout of the optical scanning apparatus, and the light intensity may differ at the one end portion and the other end portion in the main scanning area.

In the above described example embodiment, by preferably setting an incidence position and an incidence angle of the light flux, emitted from the light source, at the optical deflector, the cutting amount of the light flux, cut at the optical deflector and directed to the one end portion of the main scanning area, and the cutting amount of the light flux cut, at the optical deflector and directed to the other end portion of the main scanning area, can be different.

Specifically, if the incidence position of the light flux to the optical deflector is shifted with respect to the main scanning corresponding direction so that the light flux directed to the one end portion of the main scanning area is cut greater at the optical deflector, the light flux directed to the other end portion the of the main scanning area is cut smaller at the optical deflector. With this configuration, the light intensity at the one end portion and the other end portion of the main scanning area can become different.

With this configuration, the light intensity difference at the one end portion and the other end portion with respect to the main scanning corresponding direction, which occurs in the scanning optical system, can be canceled, and the light intensity can be set substantially evenly with respect to the main scanning corresponding direction. With this configuration, the fluctuation of light intensity profile for the entire area with respect to the main scanning corresponding direction can be set smaller, and the post-correction difference can be reduced.

As above described, the scanning optical system is disposed between the rotatable multi-faceted mirror and the scanned surface, in which the light flux reflected at the rotatable multi-faceted mirror is directed to the main scanning area on the scanned surface. When the light flux reflected at the rotatable multi-faceted mirror is directed to one end and the other end of the main scanning area, a part of one light flux entering the rotatable multi-faceted mirror may be reflected at one reflection face (first reflection face), and the remaining part of the one light flux may be reflected at another reflection face (second reflection face), in which the decrease of light intensity at one end of the main scanning area may become great due to the reflection at the another reflection face (second reflection face) compared to the decrease of light intensity at the other end of the main scanning area. In an example embodiment, in the light intensity profile in the main scanning direction by the scanning optical system when the light flux entering the rotatable multi-faceted mirror is assumed to entirely reflect on the one reflection face (first reflection face), the light intensity by the scanning optical system is greater at least one end in the main scanning direction as shown in FIG. 39. In this configuration, the above mentioned one end of the main scanning area having the greater decrease of light intensity is corresponded to the one end in the main scanning direction having greater light intensity.

For example, when the optical system sets the light intensity profile having greater intensity at the end portion as shown in the top view of FIG. 39, and when this light intensity profile by the optical system is superimposed with a light intensity profile by cutting shown in the middle view of FIG. 39, the light intensity profile on the scanned surface becomes substantially M-shape as shown in the bottom view of FIG. 39. Therefore, the fluctuation of light intensity ratio on the scanned surface can be reduced compared to a comparison example shown in FIG. 38. In this example case shown in FIG. 39, the horizontal axis representing the main scanning direction corresponds to the image height on the scanned surface, and the decrease of light intensity by cutting occurs at both ends of the image height but not limited hereto. For example, the above described configuration of example embodiment can be applied when the decrease of light intensity by cutting occurs at least one end of the image height on the scanned surface. Although the light intensity profile by the optical system schematically shown in FIG. 39 is symmetrical with respect to the center image height, an actual light intensity profile may become unsymmetrical with respect to the center image height as shown in FIG. 40.

Further, the synchronization detection sensor 2115 may be disposed at the position shown in FIG. 35, to which the light flux deflected by the optical deflector and before starting the writing enters. In this case, how to secure the light intensity of the synchronization detection light flux becomes an issue. Because the synchronization detection sensor 2115 is disposed at a position that the light flux before starting the writing enters, the decrease of light intensity at the synchronization detection sensor 2115 becomes greater than an area extending from a writing start position to a writing end position.

The decrease of light intensity near the end portion of the main scanning area on the photoconductor drum can be reduced by entering the light flux having P-polarized light component stronger than S-polarized light component with respect to the deflective reflection face of the optical deflector (see FIG. 39). In this case, the decrease of light intensity of the synchronization detection light flux caused by the cutting at the optical deflector can be smaller. Therefore, without increasing the emission light intensity of the light source but by adjusting the sensitivity of the synchronization detection sensor 2115, an effect of the decrease of light intensity of the synchronization detection light flux to synchronization detection precision can be reduced.

Compared to conventional optical scanning apparatuses using the OF type system, the above described optical scanning apparatus 2010 can set a shorter length for the optical path and thereby the optical scanning apparatus 2010 can be compact in size. The optical scanning apparatus can be compact in size by setting the length of optical path in the scanning optical system (i.e., distance from the deflective reflection face of the optical deflector to the scanned surface) shorter, in which a focal length of a scan lens is required to be set shorter.

In this case, because the field angle of the scan lens becomes greater, a position that the light flux emitted from the light source is started to be cut at the optical deflector is shifted toward a center portion of the image area with respect to the main scanning direction, and the cutting amount of the light flux, directed to the peripheral image height, at the optical deflector becomes greater. With this configuration, at the peripheral image height such as at the synchronization detection position, the decrease of light intensity due to the cutting at the optical deflector becomes greater.

If the light intensity for the synchronization detection light flux is not enough, the incidence position and incidence angle of the light flux emitted from the light source to the optical deflector are adjusted to change the cutting amount at the optical deflector, by which the decrease of light intensity for the synchronization detection light flux can be reduced.

Specifically, the light intensity at the write-start position and the light intensity at the write-end position is not set at the same level, but the incidence position and incidence angle of the light flux is adjusted so that a difference between the light intensity at the synchronization detection position and the light intensity at the write-end position becomes smaller. Because the light intensity decrease of the synchronization detection light flux can be compensated by increasing the sensitivity of the synchronization detection sensor 2115, the light intensity at the synchronization detection position and the light intensity at the write-end position are not required to set at the same level as long as desired synchronization detection precision is obtained. In this case, the light intensity at the write-start position may be set greater than the light intensity at the write-end position.

The above description describes a case that the light flux cut at the optical deflector is directed to within the image area, but not limited this case. For example, the light flux directed to the synchronization detection position may be the only light flux that is cut at the optical deflector. In this case, the incidence position and the incidence angle of the light flux emitted from the light source to the optical deflector are set with preferable values to secure the light intensity of the synchronization detection light flux, in which both of the light flux directed to the write-start position and the light flux directed to the write-end position may not be the light flux cut at the optical deflector. In this case, even if the synchronization detection sensor 2115 is disposed, the light intensity at the write-start position is not required to be set greater than the light intensity at the write-end position.

Further, as the cutting amount at the optical deflector becomes greater as the field angle of the scan lens becomes greater, the post-correction difference becomes greater unless a smaller adjustment pitch is used for the light intensity correction. To set a rough adjustment pitch, smaller fluctuation of light intensity is preferable. The rough adjustment pitch can be set using a rectangle shaped aperture for the aperture plate disposed between the light source and the optical deflector.

If the rectangle aperture is used and the same beam spot diameter is to be set on the surface of the photoconductor drum, the aperture length with respect to the main scanning corresponding direction becomes the shortest compared other shapes. Therefore, if the rectangle aperture is used to set the same beam spot diameter, the cutting at the optical deflector is started for the light directed to near the peripheral image height, by which the light intensity fluctuation in the image area can be reduced (see FIG. 41).

Further, if a size of aperture becomes smaller in the sub-scanning corresponding direction at near the both end portions with respect to the main scanning corresponding direction, it is preferable that the light passing near the both end portions of the aperture are cut at the optical deflector.

The aperture plates shown in FIGS. 12A to 12D can be preferably used. By using the shapes of aperture shown in FIGS. 12A to 12D, the decrease of light intensity that occurs when the end portion of the light flux with respect to the main scanning corresponding direction is cut at the optical deflector can be reduced, in particular minimized. Further, compared to the rectangle aperture, the cut area can be set smaller, and thereby the fluctuation of light intensity can be reduced. Further, compared to the rectangle aperture, the increase of beam spot diameter can be reduced. In this case, the aperture size with respect to the main scanning corresponding direction becomes greater, and a cut-starting position shifts toward the center image height side (i.e., an area in the main scanning area that is not cut becomes small), but the effect of the cutting can be reduced.

Figure 41:
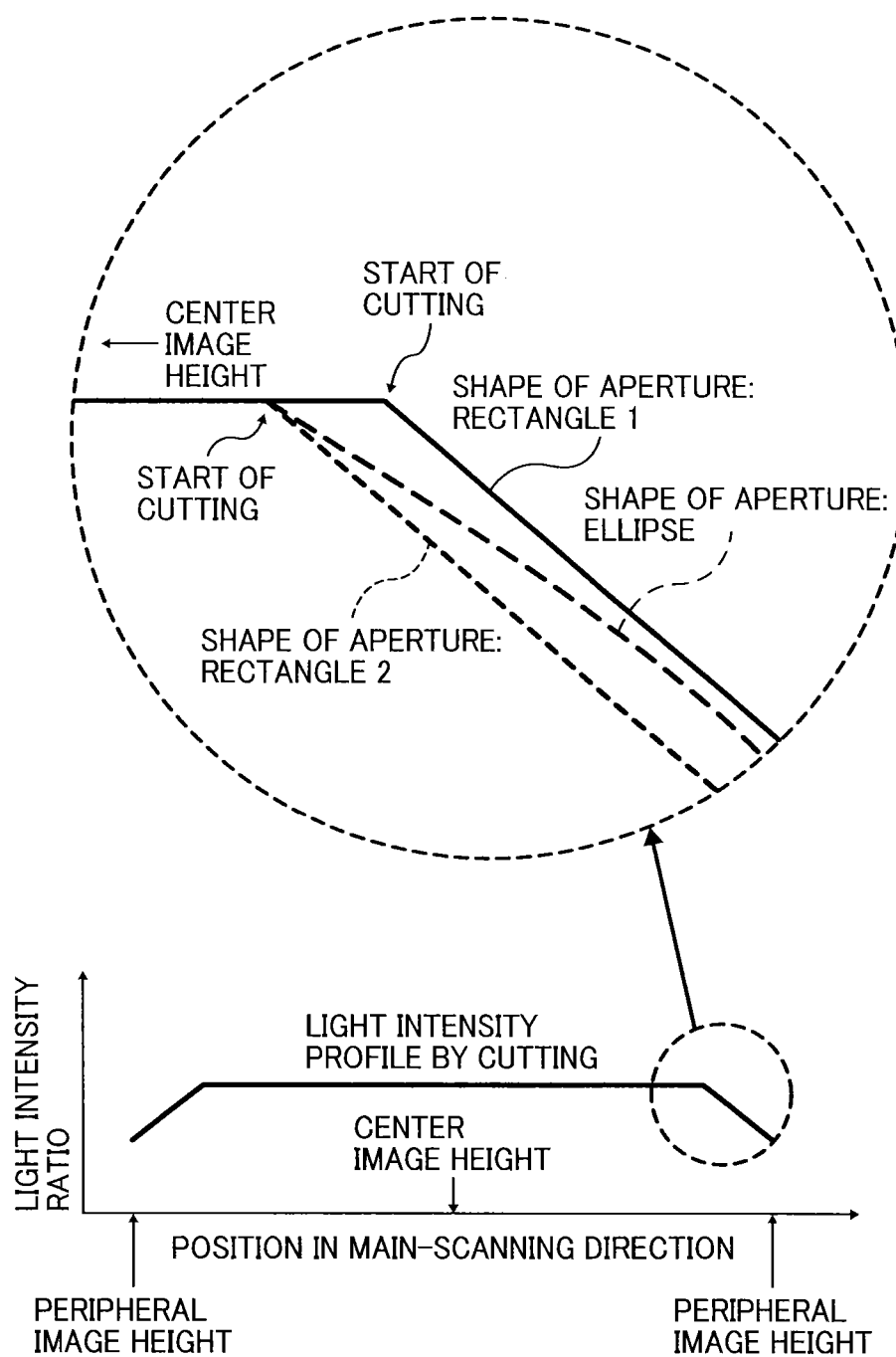
FIG. 41 shows an effect of shape of an aperture to light intensity profile set by cutting.

For example, as shown in FIG. 41, if the shape of aperture is ellipse (see FIG. 12B), compared to the shape of aperture is rectangle 1, the image height that is started to be cut (i.e., start of decrease of light intensity) shifts toward the center image height simply because the aperture size with respect to the main scanning corresponding direction is greater. Further, compared to the shape of aperture is rectangle 2, the cutting starts at the same image height but the decrease of the light intensity is small if the shape of aperture is ellipse.

The area that can be cut at the optical deflector is determined based on physical conditions, thereby the decrease of light intensity and the increase of beam spot diameter are required to be reduced within the physical conditions. By setting a cut area of the light flux cut at the optical deflector within the light flux area corresponding to a width-reduced portion in the sub-scanning corresponding direction of the aperture plate, the decrease of light intensity and the increase of beam spot diameter can be reduced.

As above described, by selectively using positions that are started to be cut, the decrease of light intensity and the increase of beam spot diameter can be reduced in view of the field angle of the scanning optical system. Specifically, the cutting-start position closer to the center portion of the main scanning area, and the cutting-start position only at the peripheral (e.g., only synchronization detection position) can be selectively used. By selectively using these cutting-start positions, the decrease of light intensity and the increase of beam spot diameter can be reduced.

Further, in the above described example embodiment, the light source can employ a monolithic edge emitting laser array, a surface emitting laser array, or the like.

Further, in the above described example embodiment, each of the two light sources includes two light emitting elements but not limited such configuration. For example, four light sources can be used while each light source has a single light emitting element. Further, two light sources can be used while each light source has a single light emitting element, in which light flux emitted from each light source is split into two light fluxes.

Further, in the above described example embodiment, the image forming apparatus is described as a multi-functional apparatus but not limited hereto. For example, the image forming apparatus may be a single function apparatus such as a copier, a printer, or a facsimile machine.

Further, the image forming apparatus can use a configuration that directly irradiates laser beams to a medium (e.g., sheet) that can generate colors by the irradiation of laser beams.

Further, the image forming apparatus can use a configuration that silver halide film is used as the image carrying member, in which a latent image is formed on the silver halide film by the optical scanning process, and the latent image can be developed using the same development process of silver halide process, and the developed image can be transferred to a photographic paper using the same baking finish of silver halide process. Further, the image forming apparatus can be used as a photoengraving apparatus, and a light beam lithography apparatus such as an apparatus that generates a computed tomography (CT) scan image or the like.

Further, in the above described example embodiment of the optical scanning unit, the light flux striking the rotatable multi-faceted mirror has P-polarized light component stronger than the S-polarized light component with respect to the deflective reflection face of the optical deflector.

Further, in the above described example embodiment of the optical scanning unit, when the light flux striking the rotatable multi-faceted mirror is entirely reflected on one reflection face, a light intensity profile in the main scanning direction, settable by a scanning optical system composed from the rotatable multi-faceted mirror until the scanned surface, becomes a light intensity profile that light intensity at an image height at least at one end in the main scanning direction is greater than light intensity at other image heights at other portions in the main scanning direction. The image height corresponds to a position in the main scanning direction. The image height at the one end in the main scanning direction having the greater light intensity is matched to an image height at one end in the main scanning direction having a greater decrease of light intensity due to the reflection of the remaining of the light flux striking the rotatable multi-face mirror at the second reflection face.

Further, in the above described example embodiment of the optical scanning unit, a synchronization detection sensor can be disposed to which the light flux reflected at the rotatable multi-faceted mirror and before starting writing enters, and the light intensity at the write-start position is greater than the light intensity at the write-end position.

Further, in the above described example embodiment of the optical scanning unit, a plate can be disposed in an optical path between the light source and the rotatable multi-face mirror. The plate has an aperture to shape light flux emitted from the light source, and the aperture is rectangle.

As described above, the optical scanning unit according to the example embodiment can optically scan a scanned surface with high speed and high precision without increasing size and cost.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An optical scanning device comprising:
a rotatable multi-faceted mirror having a plurality of reflection faces reflecting light flux emitted from a light source to scan an area on a scanned object in a main scanning direction, wherein when the light flux is orthographically projected to a plane that is perpendicular to a rotational axis of the rotatable multi-faceted mirror, a width of the light flux striking the rotatable multi-faceted mirror is narrower than a length of a reflection face of the rotatable multi-faceted mirror extending along a direction corresponding to the main scanning direction of the scanned object; and
a controller configured to:
at a first timing, control the rotatable multi-faceted mirror so that the light flux striking the rotatable multi-faceted mirror is reflected at a first reflection face and is directed to a center portion of the area on the scanned object;

at a second timing, control the rotatable multi-faceted mirror so that a part of the light flux striking the rotatable multi-faceted mirror is reflected at the first reflection face while a remaining portion of the light flux striking the rotatable multi-faceted mirror is reflected at a second reflection face, the part of the light flux being directed to at least one of two end portions of the area on the scanned object, wherein one of the two end portions of the area on the scanned object corresponds to a scanning start position or a scanning end position; and control the light source so that intensities of the light flux at the two end portions of the area on the scanned object are equal, wherein the light source is pivotable about an axis of an exit direction of the light flux so that the light flux that enters the rotatable multi-faceted mirror becomes a light flux having a P-polarized light component stronger than a S-polarized light component with respect to the reflection face of the rotatable multi-faceted mirror, and a light intensity loss at a peripheral image height at the rotatable multi-faceted mirror is reduced.

2. The optical scanning device of claim 1, further comprising:

a plate disposed on an optical path between the light source and the rotatable multi-faceted mirror, the plate having an aperture therein to shape the light flux emitted from the light source, wherein the aperture has a width along a direction corresponding to a sub-scanning direction that is perpendicular to the main scanning direction, and the width is smaller in at least one end of the aperture than a center portion of the aperture with respect to the direction corresponding to the main scanning direction of the scanned object.

3. The optical scanning device of claim 1, wherein a number of reflection faces of the rotatable multi-faceted mirror is six, seven, or eight.

4. The optical scanning device of claim 1, wherein diameters of beam spots of the light flux at both ends of the area on the scanned object are equal.

5. An image forming apparatus comprising:
at least one image carrying member; and
the optical scanning device of claim 1 scans the at least one image carrying member using light flux modulated based on image information.

6. An optical scanning device comprising:
a light source;
a rotatable multi-faceted mirror having a plurality of reflection faces to scan light flux emitted from the light source to a predetermined area on a scanned object; and
a controller to control light intensity of the light flux, wherein:
when the light flux is orthographically projected to a plane perpendicular to a rotational axis of the rotatable multi-faceted mirror, a width of the light flux striking the rotatable multi-faceted mirror is narrower than a length of a reflection face of the rotatable multi-faceted mirror extending along a direction corresponding to a scanning direction;

when a center portion of the predetermined area on the scanned object is scanned, all of the light flux emitted from the light source enters a first reflection face of the rotatable multi-faceted mirror, and a width of the light flux striking the rotatable multi-faceted mirror and a width of the light flux reflected by the first reflection face and then directed to the center portion of the predetermined area on the scanned object have equivalent widths;

when at least one of a starting end and a terminating end of the predetermined area on the scanned object is scanned, the light flux emitted from the light source enters the first reflection face of the rotatable multi-faceted mirror and a second reflection face of the rotatable multi-faceted mirror adjacent to the first reflection face, and a width of the light flux reflected at the first reflection face and then directed to at least one of the starting end and the terminating end of the predetermined area on the scanned object is narrower than a width of the light flux striking the rotatable multi-faceted mirror;

the controller controls the light intensity to become equal at the starting end and the terminating end of the predetermined area; and the light source is pivotable about an axis of an exit direction of the light flux so that the light flux that enters the rotatable multi-faceted mirror becomes a light flux having a P-polarized light component stronger than a S-polarized light component with respect to the reflection face of the rotatable multi-faceted mirror, and a light intensity loss at a peripheral image height at the rotatable multi-faceted mirror is reduced.

7. The optical scanning device of claim 6, further comprising:

a plate disposed on an optical path between the light source and the rotatable multi-faceted mirror, the plate having an aperture therein to shape the light flux emitted from the light source, wherein the aperture has a width along a direction corresponding to a sub-scanning direction that is perpendicular to a main scanning direction, and the width is smaller in at least one end of the aperture than a center portion of the aperture with respect to the direction corresponding to the main scanning direction of the scanned object.

8. The optical scanning device of claim 6, wherein a number of reflection faces of the rotatable multi-faceted mirror is six, seven, or eight.

9. The optical scanning device of claim 6, wherein diameters of beam spots of the light flux at both ends of the predetermined area on the scanned object are equal.

10. An image forming apparatus comprising:
at least one image carrying member; and
the optical scanning device of claim 6 scans the at least one image carrying member using light flux modulated based on image information.

* * * * *